(12) United States Patent
Wang et al.

(10) Patent No.: US 10,644,971 B2
(45) Date of Patent: May 5, 2020

(54) GRAPH SEARCH IN STRUCTURED QUERY LANGUAGE STYLE QUERY

(71) Applicant: AppDynamics LLC, San Francisco, CA (US)

(72) Inventors: Tao Wang, Issaquah, WA (US); Ellen Finch, San Francisco, CA (US); Arash Rassouli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 15/421,151

(22) Filed: Jan. 31, 2017

(65) Prior Publication Data
US 2018/0219752 A1    Aug. 2, 2018

(51) Int. Cl.
*H04L 12/26* (2006.01)
*H04L 29/08* (2006.01)
(Continued)

(52) U.S. Cl.
CPC ............ *H04L 43/067* (2013.01); *G06F 16/24* (2019.01); *G06F 16/2428* (2019.01);
(Continued)

(58) Field of Classification Search
CPC ... H04L 41/12; H04L 43/045; H04L 43/0888; H04L 12/2803; H04L 12/2821; H04L 12/2838; H04L 2012/2841; H04L 41/22; H04L 43/026; H04L 47/10; H04L 47/122; H04L 63/1408; H04L 43/16; H04L 41/08; H04L 41/0853; H04L 41/0883; H04L 41/142; H04L 43/028; H04L 43/062; H04L 43/0811; H04L 43/0852; H04L 43/14; H04L 63/105; H04L 67/18; H04L 67/22; H04L 41/04; H04L 41/046; H04L 41/5019; H04L 41/5096; H04L 43/06; H04L 43/067; H04L 67/02; H04L 67/42; H04L 51/10;
(Continued)

(56) References Cited

U.S. PATENT DOCUMENTS 7,330,887 B1 * 2/2008 Dharmadhikari ... G06F 11/3419
709/224
9,747,618 B1 * 8/2017 Reiss ................. G06Q 30/0275
(Continued)

*Primary Examiner* — Djenane M Bayard
(74) *Attorney, Agent, or Firm* — Behmke Innovation Group LLC; James M. Behmke; James J. Wong

(57) ABSTRACT

In one aspect, a system for performing graph searches in an SQL style query for monitored data includes a processor; a memory; and one or more modules stored in the memory and executable by a processor to perform operations including: receive, by a controller in communication with agents installed at machines connected over a network, monitored data regarding applications running over the machines; identify performance issues from the received monitored data; provide an interactive user interface to enable creation of a query for the monitored data and the identified performance issues; receive input associated with a new query including a SELECT clause, a FROM clause, and a WHEREIN clause; create the new query based on the received input; convert at least a portion of the new query to contain a graph traversal path entirely within the FROM clause; execute the new query; and return a result.

24 Claims, 27 Drawing Sheets

(51) Int. Cl.
*G06F 16/24* (2019.01)
*G06F 16/242* (2019.01)
*H04L 12/24* (2006.01)

(52) U.S. Cl.
CPC .......... *G06F 16/2445* (2019.01); *H04L 41/22* (2013.01); *H04L 41/5025* (2013.01); *H04L 43/045* (2013.01); *H04L 67/025* (2013.01); *H04L 43/16* (2013.01)

(58) Field of Classification Search
CPC . H04L 51/38; H04L 61/1594; H04L 67/2804; H04L 67/32; H04L 67/2819; H04L 67/10; H04L 67/2823; H04L 67/325; H04L 29/06047; H04L 41/50; H04L 5/0085; G06F 16/9024; G06F 21/105; G06F 3/0482; G06F 8/60; G06F 8/34; G06F 8/70; G06F 9/5066; G06F 16/245; G06F 16/248; G06F 16/258; G06F 16/90335; G06F 21/56; G06F 2221/0773; G06F 8/20; G06F 8/36; G06F 9/44521; G06F 16/283; G06F 16/9535; G06F 17/2705; G06F 21/566; G06F 16/122; G06F 9/445; G06F 11/2294; G06F 11/323; G06F 11/3414; G06F 11/3438; G06F 11/3466; G06F 11/3495; G06F 11/3684; G06F 11/3688; G06F 17/218; G06F 17/2211; G06F 17/2235; G06F 17/227; G06F 17/24; G06F 17/30247; G06F 17/3028; G06F 17/30663; G06F 17/30876; G06F 1/329; G06F 21/577; G06F 21/6209; G06F 21/6218; G06F 2201/81; G06F 2201/875; G06F 2209/504; G06F 2209/508; G06F 3/0488; G06F 3/1454; G06F 8/31; G06F 8/38; G06F 8/44; G06F 8/4442; G06F 9/4443; G06F 9/4492; G06F 9/485; G06F 9/5022; G06F 9/5072; G06F 9/547

See application file for complete search history.

(56) References Cited

U.S. PATENT DOCUMENTS

| | | | |
|---|---|---|---|
| 2013/0067069 A1* | 3/2013 | Allen | G06F 9/466 709/224 |
| 2013/0275429 A1* | 10/2013 | York | G06Q 50/01 707/737 |
| 2014/0365522 A1* | 12/2014 | Soundararajan | G06F 16/28 707/770 |
| 2015/0295796 A1* | 10/2015 | Hsiao | H04L 41/0813 715/738 |
| 2015/0310129 A1* | 10/2015 | Ushijima | G06F 16/25 707/798 |
| 2016/0094615 A1* | 3/2016 | Wiener | H04L 67/1095 709/217 |
| 2016/0105350 A1* | 4/2016 | Greifeneder | H04L 41/046 709/224 |
| 2016/0179883 A1* | 6/2016 | Chen | G06F 16/24528 707/714 |
| 2017/0063653 A1* | 3/2017 | Kieviet | H04L 41/0246 |

\* cited by examiner

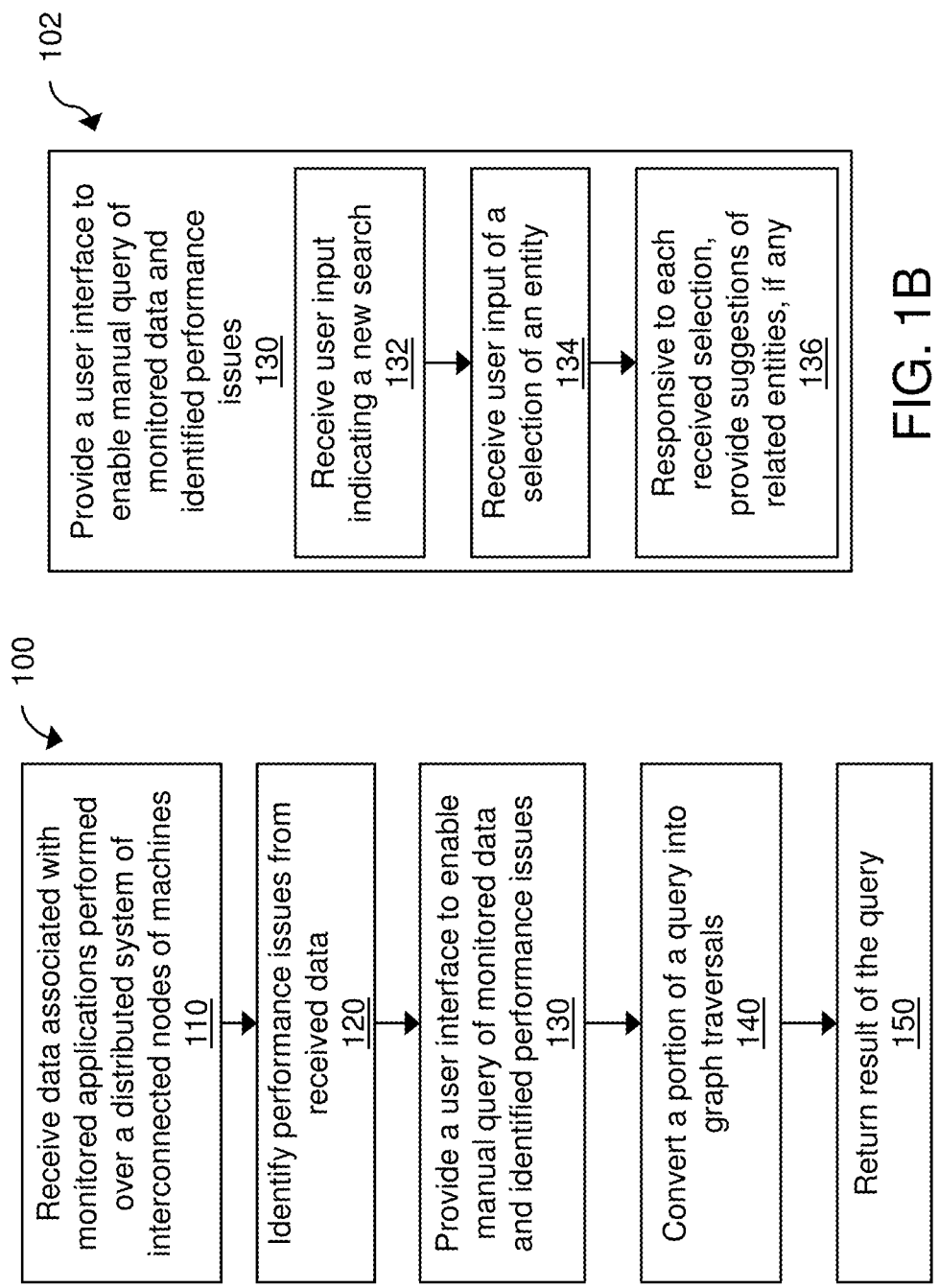

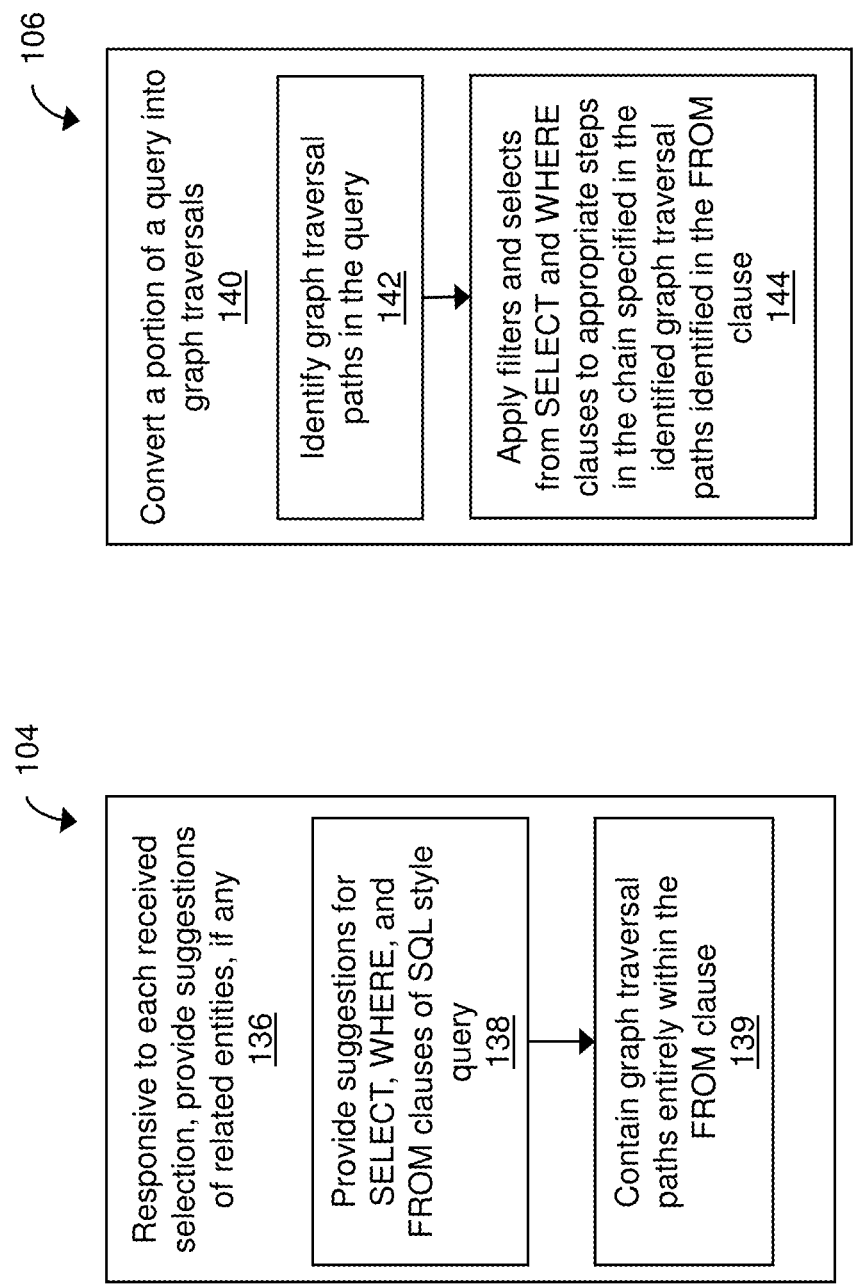

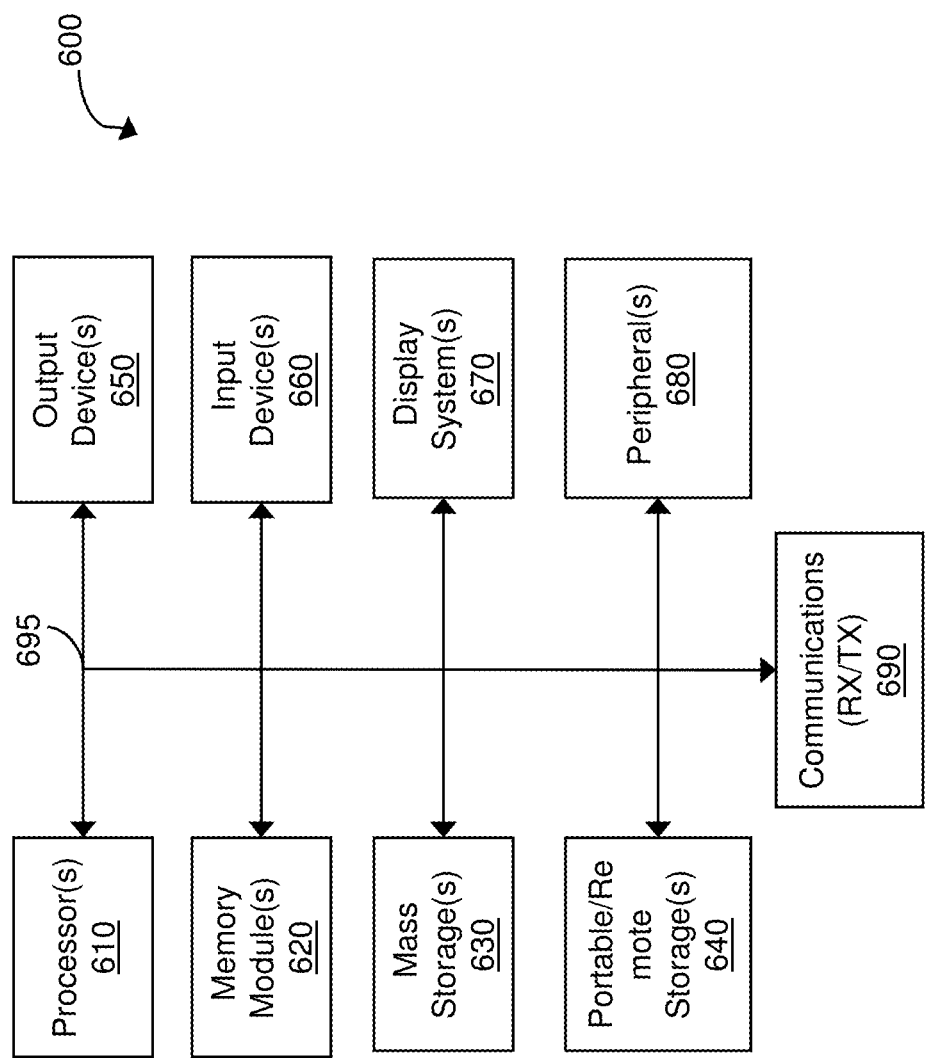

GRAPH SEARCH IN STRUCTURED QUERY LANGUAGE STYLE QUERY

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of performing graph searches in Structured Query Language (SQL) style queries are disclosed. Specifically, the disclosed technology for performing graph searches in SQL style queries are used to query all data sets during performance monitoring by combining the graph search capabilities in SQL style queries.

In one aspect, a system for performing graph searches in a Structured Query Language (SQL) style query for monitored data is disclosed. The system includes a processor; a memory; and one or more modules stored in the memory and executable by a processor to perform operations. The operations include: receive, by a controller in communication with agents installed at machines connected over a network, monitored data regarding applications running over the machines; identify, by the controller, performance issues from the received monitored data; provide, by the controller, an interactive user interface to enable creation of a query for the monitored data and the identified performance issues; receive, through the provided interactive user interface, input associated with a new query including a SELECT clause, a FROM clause, and a WHEREIN clause; create the new query based on the received input; convert at least a portion of the new query to contain a graph traversal path entirely within the FROM clause; execute the new query; and return a result of the executed new query.

The system can be implemented in various ways to include one or more of the following features. The one or more modules can be executable to perform operations including: receive an indication of initiating a basic or advanced query. The one or more modules can be executable to perform operations including: provide a suggestion for at least a portion of the new query based on the received input. The one or more modules can be executable to perform operations including: analyze a context of at least a portion of the received input to provide the suggestion. The one or more modules are executable to perform operations including: recognize a pattern of at least a portion of the received input to provide the suggestion. The provided suggestion can include a list of related entities. The SELECT and WHEREIN clauses of the new query can be in SQL style and the FROM clause can contain the graph traversal path. The graph traversal path can represent a chain of relationship between different entities.

In another aspect, a method for performing graph searches in a Structured Query Language (SQL) style query for monitored data is disclosed. The method includes: receiving, by a controller in communication with agents installed at machines connected over a network, monitored data regarding applications running over the machines; identifying, by the controller, performance issues from the received monitored data; providing, by the controller, an interactive user interface to enable creation of a query for the monitored data and the identified performance issues; receiving, through the provided interactive user interface, input associated with a new query including a SELECT clause, a FROM clause, and a WHEREIN clause; creating the new query based on the received input; converting at least a portion of the new query to contain a graph traversal path entirely within the FROM clause; executing the new query; and returning a result of the executed new query.

The method can be implemented in various ways to include one or more of the following features. The method can include receiving an indication of initiating a basic or advanced query. The method can include providing a suggestion for at least a portion of the new query based on the received input. The method can include analyzing a context of at least a portion of the received input to provide the suggestion. The method can include recognizing a pattern of at least a portion of the received input to provide the suggestion. The provided suggestion can include a list of related entities. The SELECT and WHEREIN clauses of the new query can be in SQL style and the FROM clause can contain the graph traversal path. The graph traversal path can represent a chain of relationship between different entities.

In yet another aspect, a non-transitory computer readable medium embodying instructions when executed by a processor to cause operations to be performed for performing graph searches in a Structured Query Language (SQL) style query for monitored data is disclosed. The operations include receiving, by a controller in communication with agents installed at machines connected over a network, monitored data regarding applications running over the machines; identifying, by the controller, performance issues from the received monitored data; providing, by the controller, an interactive user interface to enable creation of a query for the monitored data and the identified performance issues; receiving, through the provided interactive user interface, input associated with a new query including a SELECT clause, a FROM clause, and a WHEREIN clause; creating the new query based on the received input; converting at least a portion of the new query to contain a graph traversal path entirely within the FROM clause; executing the new query; and returning a result of the executed new query.

The non-transitory computer readable medium can be implemented in various ways to include one or more of the following features. The operations can include receiving an indication of initiating a basic or advanced query. The operations can include providing a suggestion for at least a portion of the new query based on the received input. The operations can include analyzing a context of at least a portion of the received input to provide the suggestion. The operations can include recognizing a pattern of at least a portion of the received input to provide the suggestion. The provided suggestion can include a list of related entities. The SELECT and WHEREIN clauses of the new query can be in SQL style and the FROM clause can contain the graph traversal path. The graph traversal path can represent a chain of relationship between different entities.

BRIEF DESCRIPTION OF THE DRAWINGS

FIGS. 1A, 1B, 1C, and 1D are process flow diagrams of exemplar processes for performing graph searches in SQL style queries.

FIG. 6 is a block diagram of an exemplary computing system implementing the disclosed technology.

DETAILED DESCRIPTION

Figure 2A:
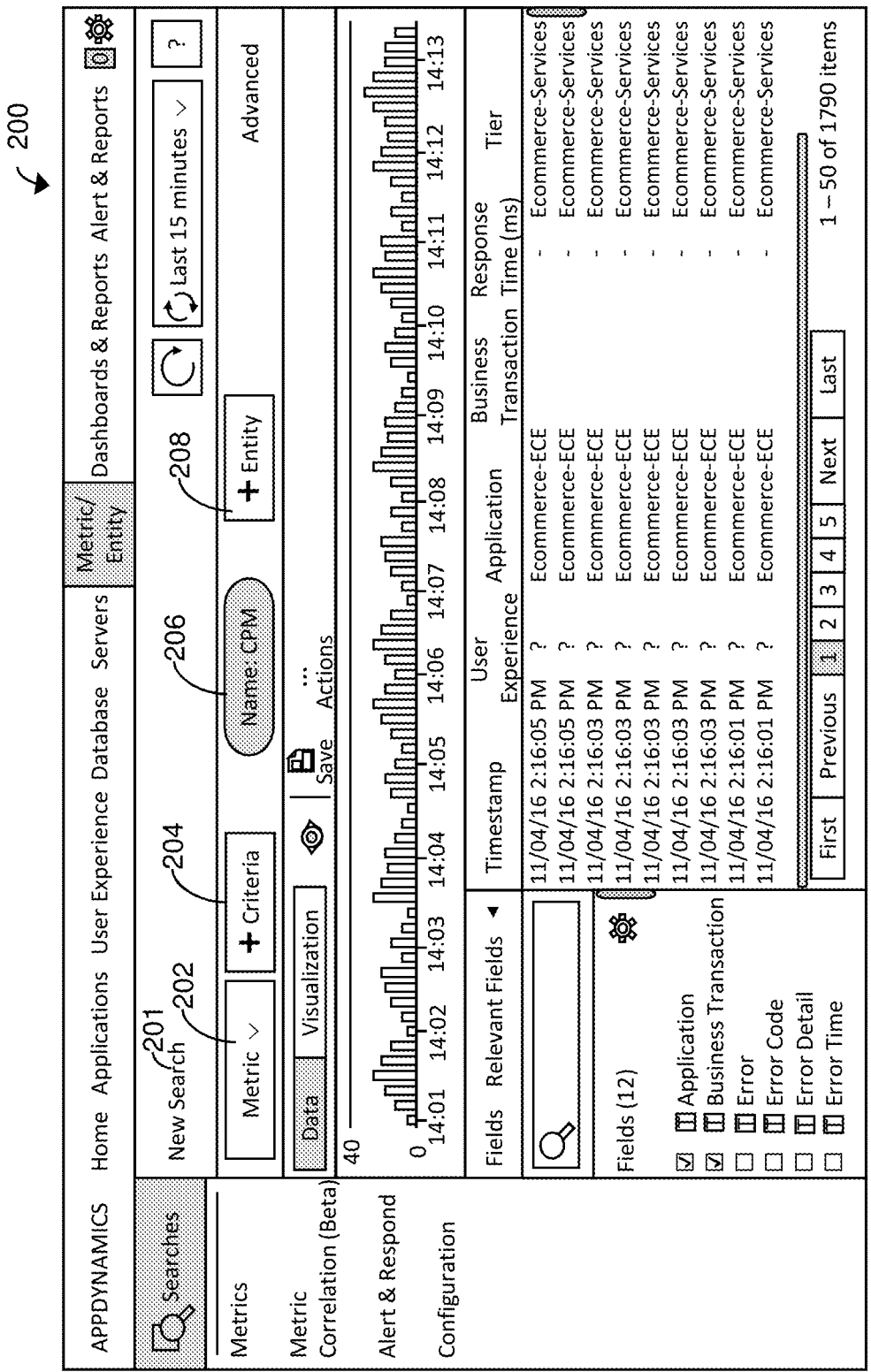
FIGS. 2A, 2B, 2C are block diagrams of an exemplary interactive user interface illustrating a process for enabling a user to create a basic query that includes graph searches in an SQL style query.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. Monitored data can include metrics data that can be queried to identify performance issues. Because metrics data are defined by the relationships between different entities, and entities such as nodes are not directly related to the monitored application, graph traversals best represent the metrics data.

Graph Searches in SQL Style Queries Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to perform graph searches in SQL style queries. The disclosed technology provides the graph search capabilities in SQL style queries so that monitored data including metrics that are defined with respect to entities, such as tiers and nodes can be best represented as a graph traversal within the SQL style queries. SQL style queries use SELECT, FROM, and WHERE clauses to indicate which columns of a data set to select, which data set to select from, and what filters to use on the data. However, because entities, such as nodes, are not directly related to the application being monitored, graph searches can be used to indicate the relationships among the entities within SQL style queries.

The disclosed technology for performing graph searches in SQL style queries allows all data set, including metric data to be queried using SQL style queries by incorporating graph searches in SQL style queries. Graph searches enables traversals from the application being monitored to its tiers, and then from the tiers to their nodes.

Graph Searches in SQL Style Queries Process

FIGS. 1A, 1B, 1C, and 1D are process flow diagrams of exemplar processes 100, 102, 104, and 106 for performing graph searches in SQL style queries. As discussed further below with respect to FIGS. 4-6, performance issues with a monitored environment is detected by monitoring applications and entities, such as transactions, tiers, nodes, and machines in the monitored environment using agents installed at individual machines at the entities. For example, each node can include one or more machines that perform part of the applications. The agents collect data associated with the applications of interest and associated nodes and machines where the applications are being operated. Examples of the collected data include performance data, such as metrics, metadata, and topology data that indicate relationship information. A controller in communication with the agents receive the data collected by the agents (110). The controller can analyze the received monitored data to identify performance issues with the monitored applications (120). The controller can provide a user interface to enable manual queries of monitored data and identified performance issues (130). A portion of a query generated using input received through the user interface is converted into graph traversals (140). Once the query is executed, a result of the executed query is returned and provided through the user interface (150).

Providing the user interface (130) can include additional features. For example, user input indicating a new search or query can be received through the provided user interface (132). Once generation of the indicated new query is started, user input of a selection of an application and/or entity is received through the provided user interface (134). Responsive to each user input received, suggestions of additional selections, such as related entities, if any, are provided (136).

Providing suggestions of additional selections, such as related entities, if any, are (136) can include additional features. For a given SQL style query, suggestions for SELECT, WHERE, and FROM clauses are provided (138). In addition, graph traversal paths that identify the relationship between entities are contained entirely within the FROM clause (139).

Converting a portion of a query into graph traversals (140) can include additional features. For example, the graph traversal paths are identified from the query (142). Because the graph traversal paths are contained entirely within the FROM clause, the graph traversal paths can be identified from the FROM clause. The graph traversal paths represent a chain of related entities. The selections from the SELECT and WHERE clauses are applied to the appropriate steps in the identified graph traversal paths. The selections from the SELECT and WHERE clauses can represent filters for the query, for example.

Graph Searches in SQL Style Queries: Exemplary Applications

Certain data, such as metrics are defined with respect to entities, and entities are most frequently accessed in terms of their relationships to other entities. For example, queries can be performed to view metrics for all nodes in an application. To identify the right set of nodes, a query must be created to traverse from the application to its related entities. For example, a graph traversal path can be determined from the application to its related tiers, then from the tiers to their nodes.

As described with respect to FIGS. 1A, 1B, 1C, and 1D, an SQL style query can be created by using SELECT, WHERE, and FROM clauses. Within the SQL style query, the graph search element is contained entirely within the FROM clause, leaving the SELECT and WHERE clauses in pure SQL style.

The following is an exemplary query that incorporates graph searches in an SQL type query:

SELECT n.name, t.id
FROM Application as a→Tier as t→Node as n
WHERE a.name='ACME Book Store' and t.name in ('Tier 1', 'Tier 2')

In this above example query, the SELECT and WHERE clauses remain in SQL style while the FROM clause includes the graph traversal path that indicates a chain of relationships from the Application to the Tier and then from the Tier to the Node. The results of the above example query are tuples of (node name, tier id) for all the nodes in the ACME Book Store application belonging to the tiers Tier 1 and Tier 2.

Even though the correct sets of nodes and tiers cannot be accessed without traversing from the application, the SELECT and WHERE clauses of the query do not need to specify the graph traversal path, because the graph traversal path is encapsulated in the FROM clause.

To resolve the example query, a processor converts the example query into a graph traversal by applying the filters and selects from the SELECT and WHERE clauses to the appropriate steps in the graph traversal path specified in the FROM clause. For the above example, the traversal would start at Application entities, apply all the relevant filters, then traverse to Tiers, apply those filters and select the id fields of the matched entities, then traverse to Nodes and select the name fields of those matched entities.

Figure 2B:
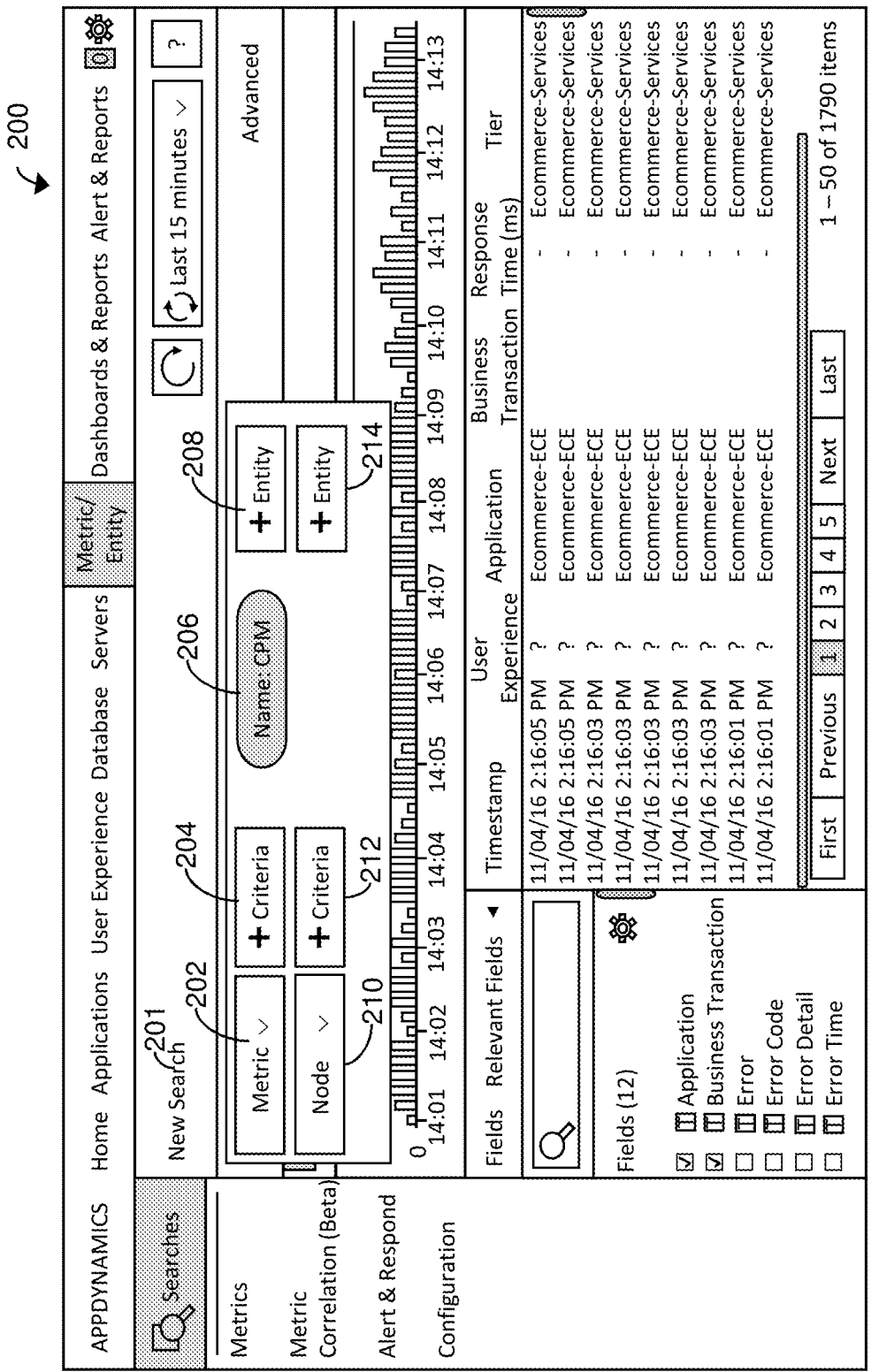
Figure 2C:
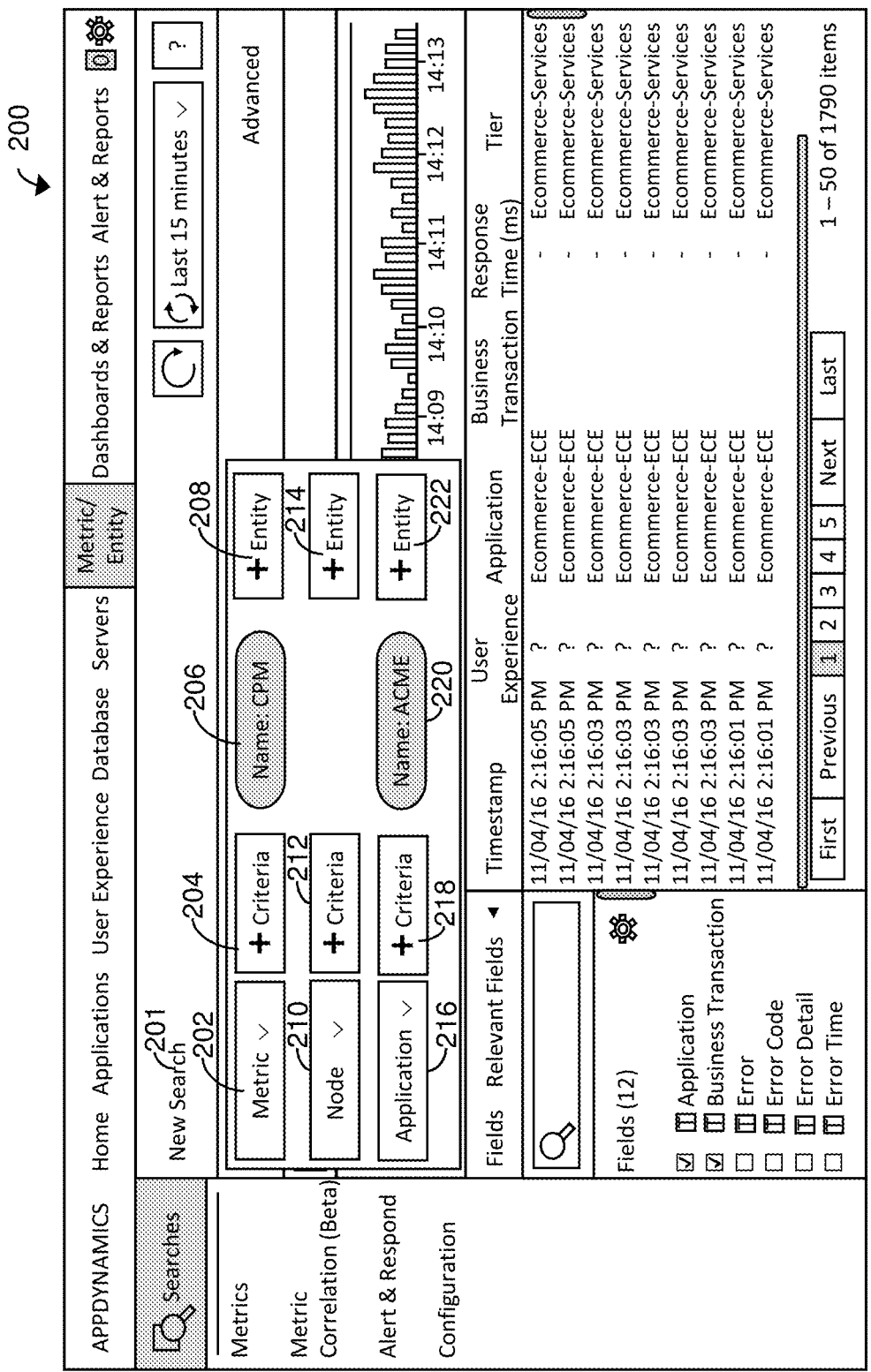

To enable the creation of graph searches in SQL style queries, an interactive user interface can be provided by the controller. FIGS. 2A, 2B, 2C are block diagrams of an exemplary interactive user interface 200 illustrating a process for enabling a user to create a basic query that includes graph searches in an SQL style query. An input is received indicating that a New Search 201 is initiated. Indication of initiating a new search can include detecting user interaction with any of the search interface elements, such as user selection elements 202, 204, 206, and 208. These user selection elements can include drop down menus, buttons, input window or any other compatible user interface elements for providing a user selection or input. For example, detecting a user selection of the dropdown element 202 indicates that a basic search for Metric data source has been initiated. Responsive to detecting the user selection of the dropdown element 202, related entities for the element are suggested to the user. For example, Tiers, Nodes, Applications can be suggested to the user.

The user interface element 204 can be used to receive user input indicating adding criteria on the selected source, which is Metric in the example shown in FIG. 2A. Responsive to detecting a user selection of element 204, available criteria fields for the selected Metric are suggested to the user. For example, fields of the entity "name", "tag", "value", "sum", etc. can be suggested to the user through element 206. In the example shown in FIG. 2A a Metric having the name 'CPM' 206 has been suggested and selected.

Detecting a user interaction with the '+Entity' element 208 indicates that additional related entities will be added to the query. FIG. 2B shows additional user interface elements 210 and 212 for detecting user input indicating additional entities to be added to the query. Detecting a user interaction with element 210 indicates that a related Node entity is to be added to the query. Responsive to detecting a user interaction with '+Criteria' element 212, fields of the Node entity are suggested to the user through element 214. When the query creation ends at this point, the resultant query is as follows:

SELECT *
FROM Metric→Node
WHERE Metric.name='CPM'

The SELECT and WHERE clauses remain as SQL style while the FROM clause contains the graph traversal path from Metric to Node. The query looks for the Metric with the name 'CPM' in all nodes.

Detecting a user interaction with the '+Entity' element 214 indicates that additional related entities will be added to the query. FIG. 2C shows additional user interface elements 216, 218, 220, and 222 for detecting user input indicating additional entities added to the query. Detecting a user interaction with element 216 indicates that a related Application entity will be added to the query. Responsive to detecting a user interaction with '+Criteria' element 218, fields of the Application entity are suggested to the user through element 220. In the example shown in FIG. 2C, an Application having the name 'ACME' has been suggested and selected. When the query creation ends at this point, the resultant query is as follows:

SELECT *
FROM Metric→Node→Tier→Application
WHERE Metric.name='CPM' and Application.name='ACME'

In the above query, the SELECT and WHERE clauses remain as SQL style while the FROM clause contains the graph traversal path from Metric to Node, from Node to Tier, and then from Tier to Application. The query looks for the Metric with the name 'CPM' and the Application with the name 'ACME'.

Detecting a user interaction with the '+Entity' element 222 indicates that additional related entities will be added to the query. While not shown in FIGS. 2A, 2B, and 2C, additional entries can be added to the query to apply as filters and selections.

Responsive to detecting user interactions with the dropdown elements 202, 210, and 216, related entities such as Metric, Tier, Node, and Application are suggested to the user. However, not all entities need to be selected. For example, the interactive user interface 200 enables the user to skip entity selection steps as applicable. For example, because Nodes rather than Tiers are usually filtered by Application, the Tier selection step can be skipped as shown in FIGS. 2B and 2C.

Figure 3A:
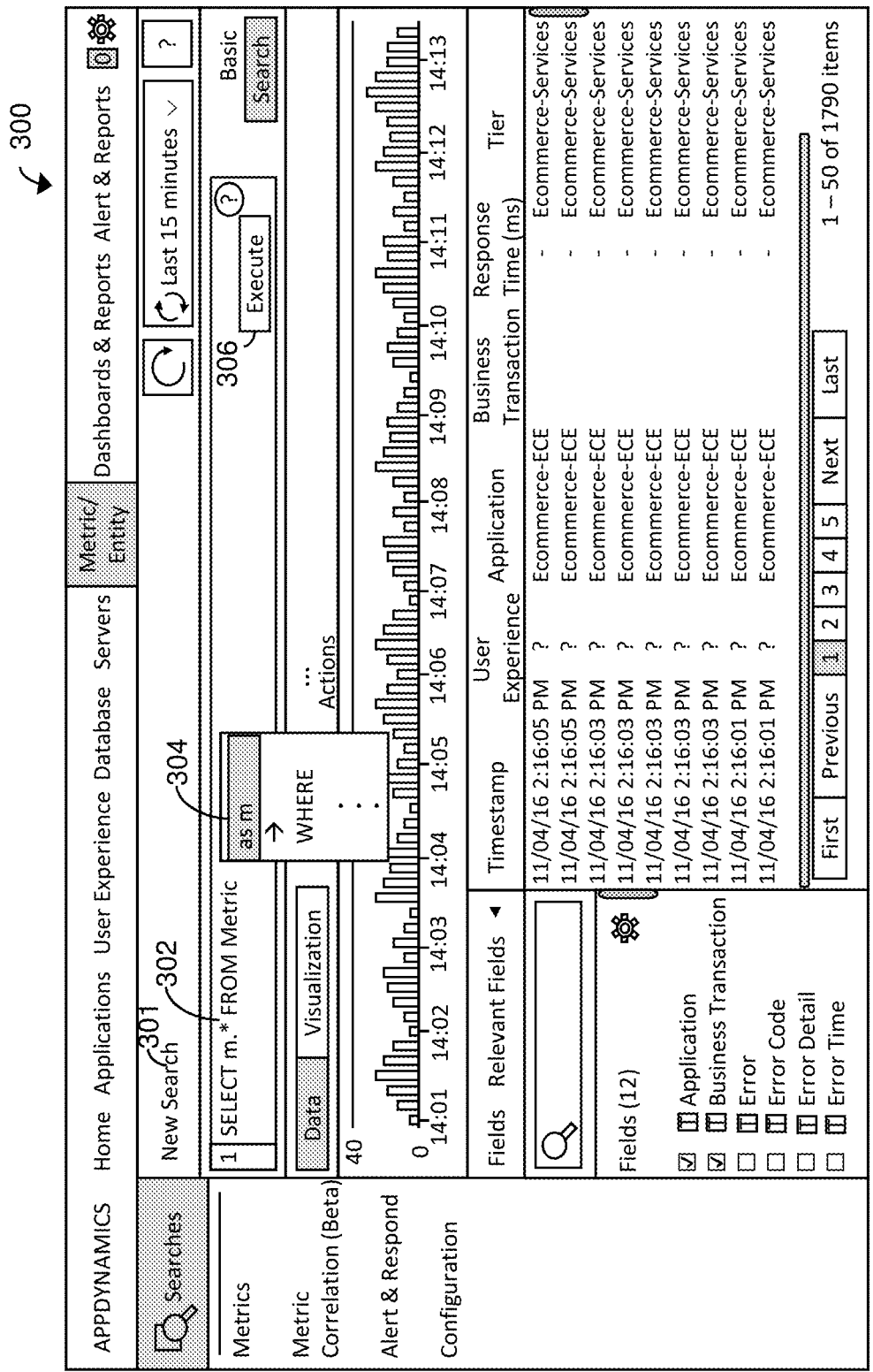
FIGS. 3A through 3S are block diagrams of an exemplary interactive user interface 200 illustrating a process for enabling a user to create an advanced query that includes graph searches in an SQL style query.
Figure 3B:
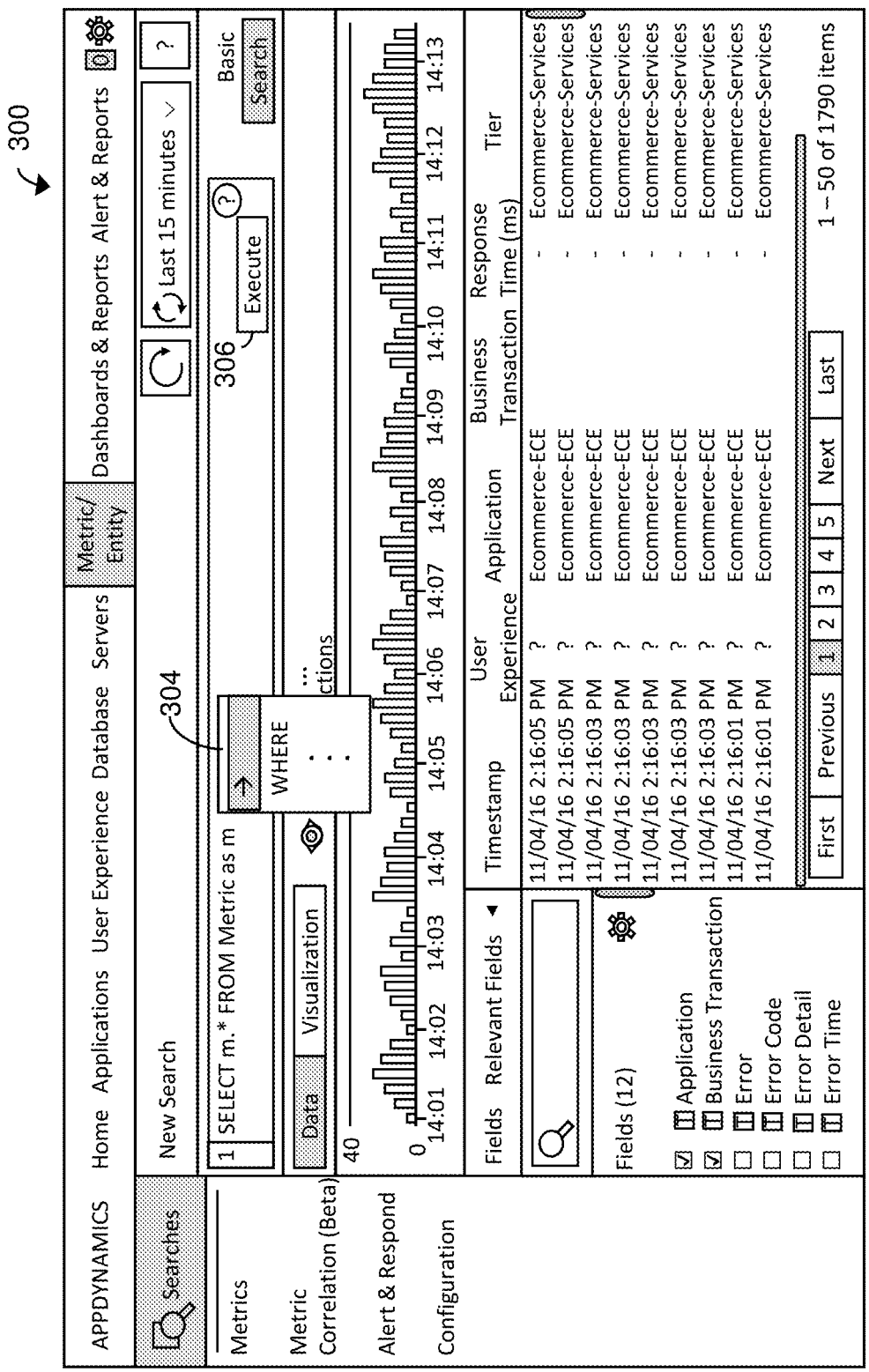
Figure 3C:
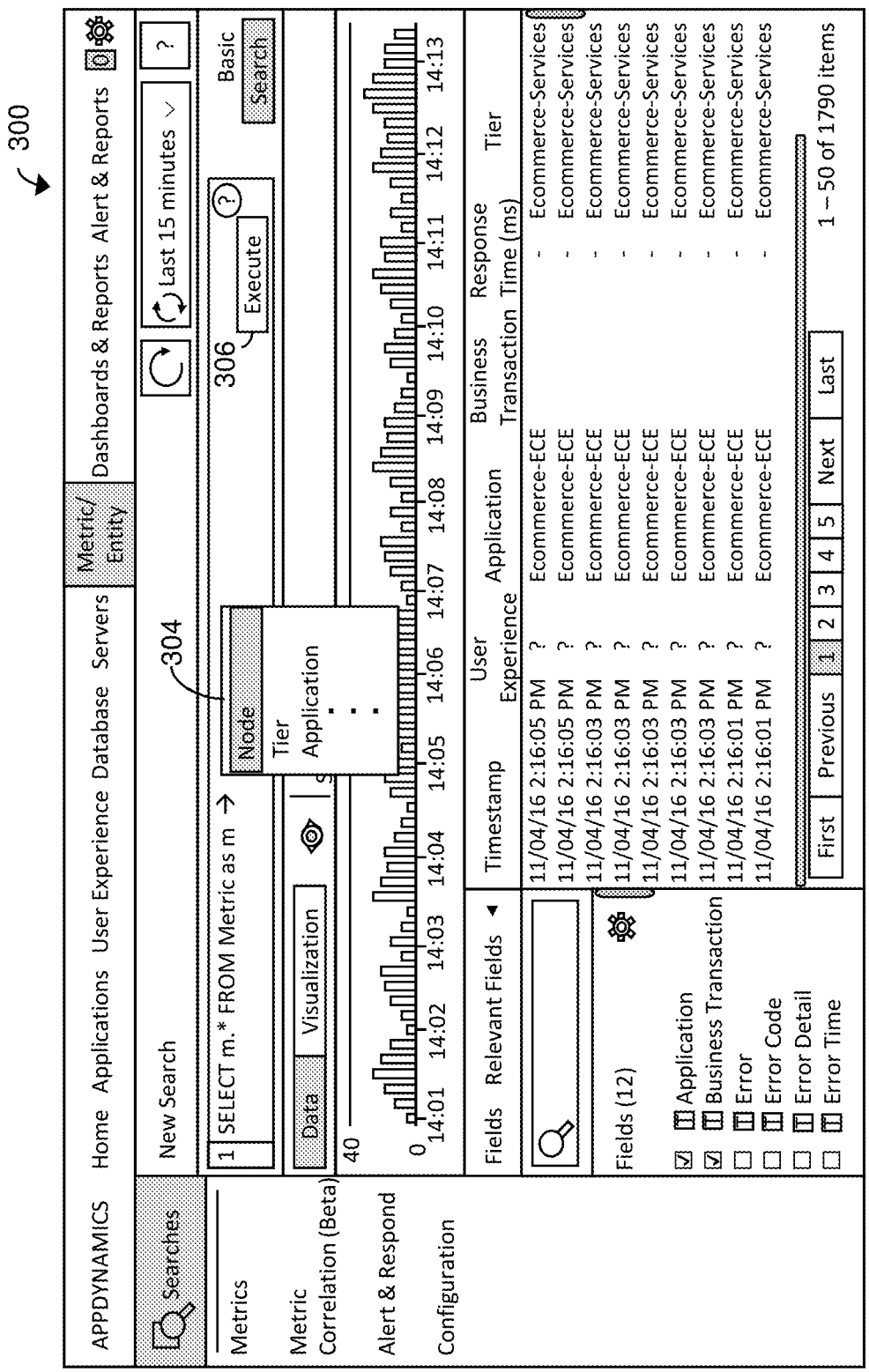
Figure 3D:
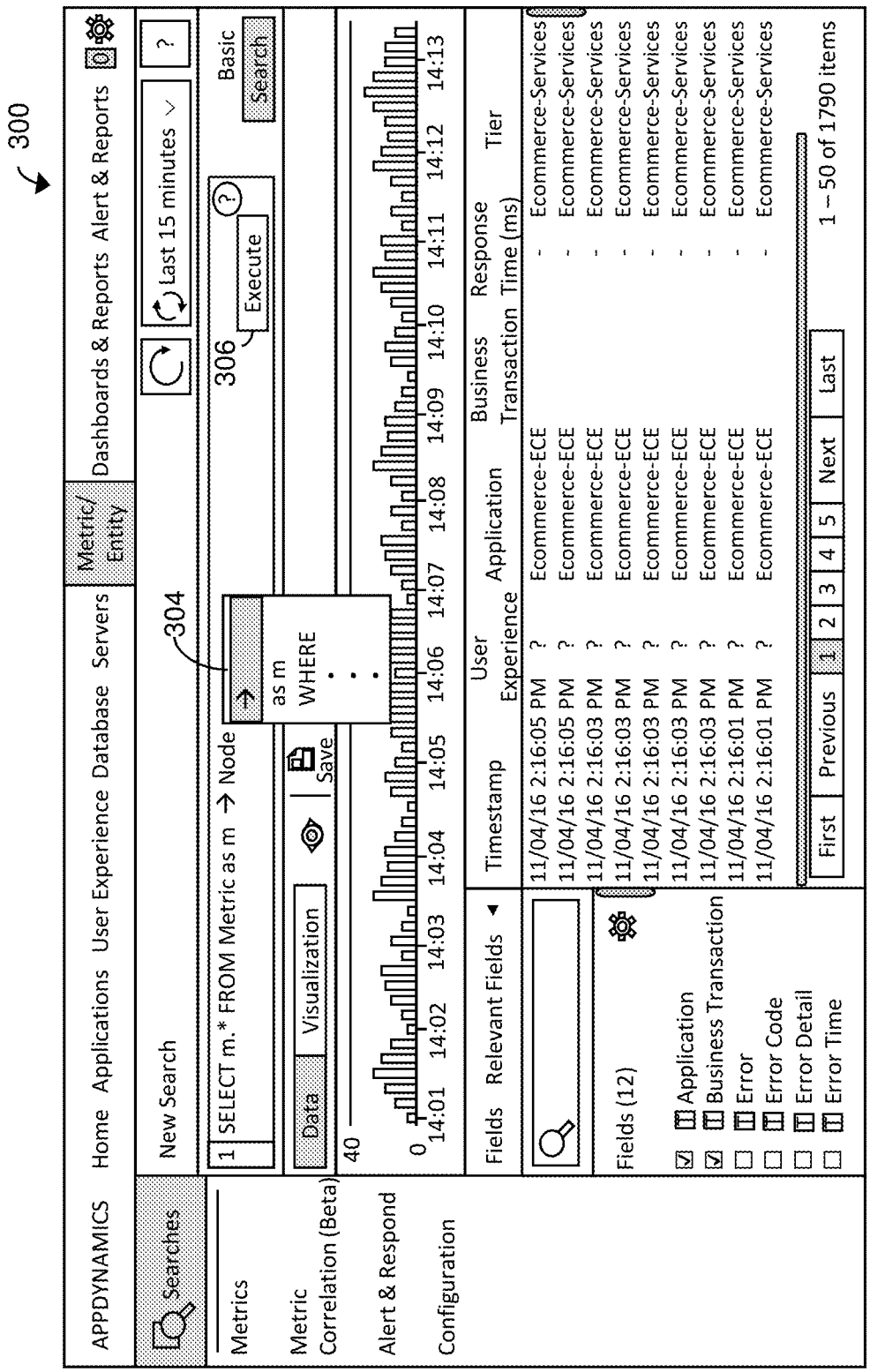
Figure 3E:
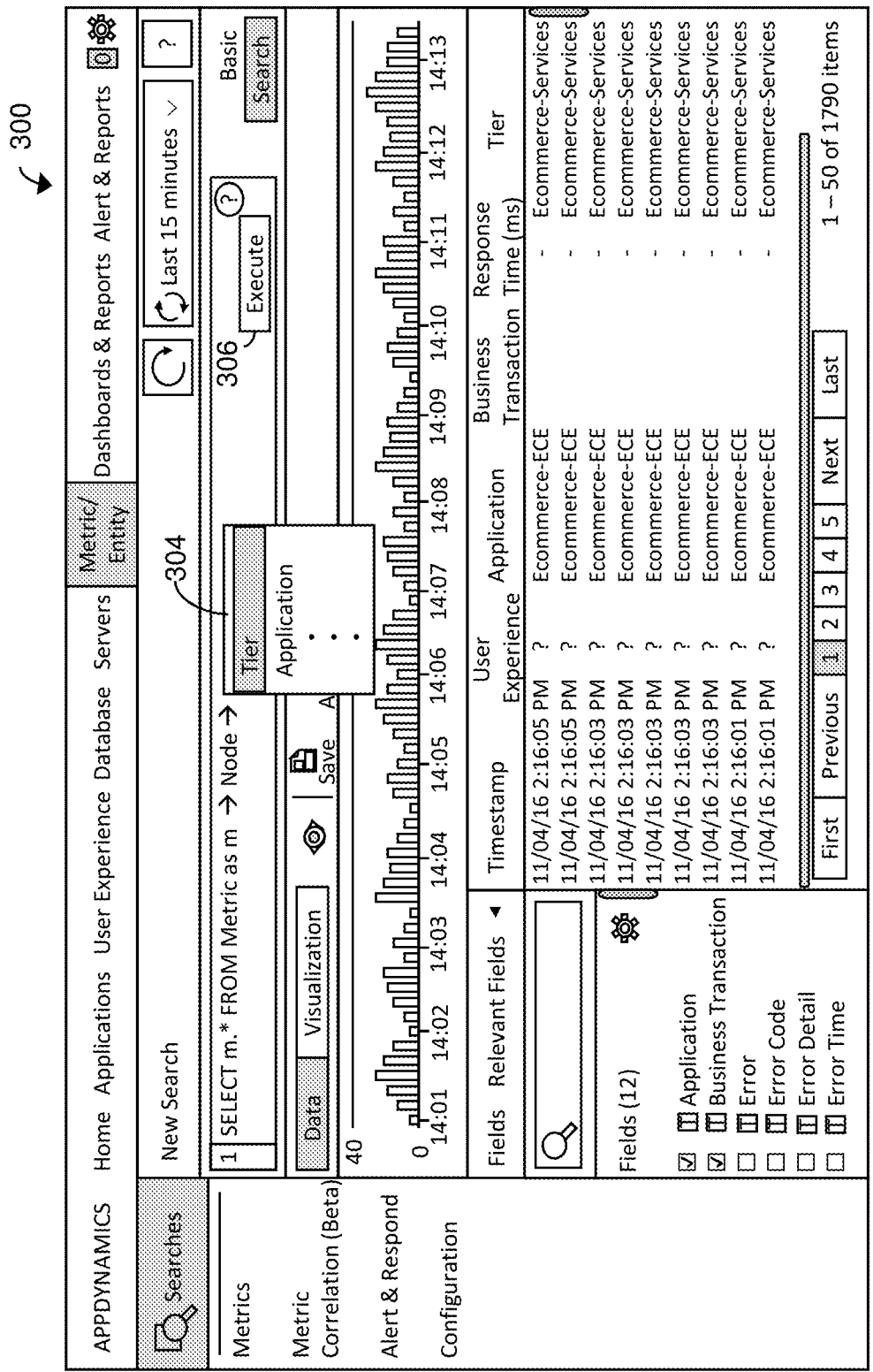
Figure 3F:
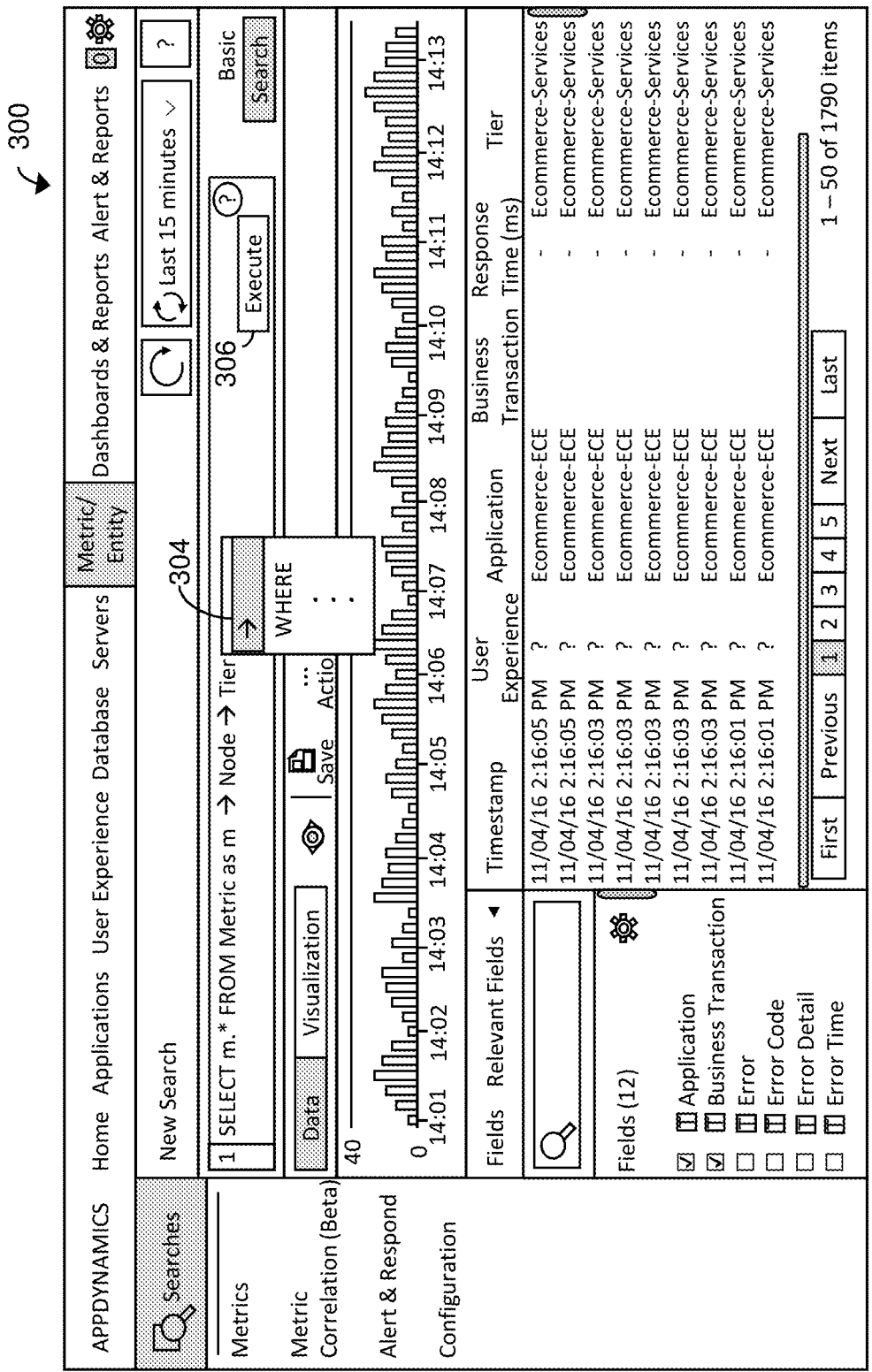
Figure 3G:
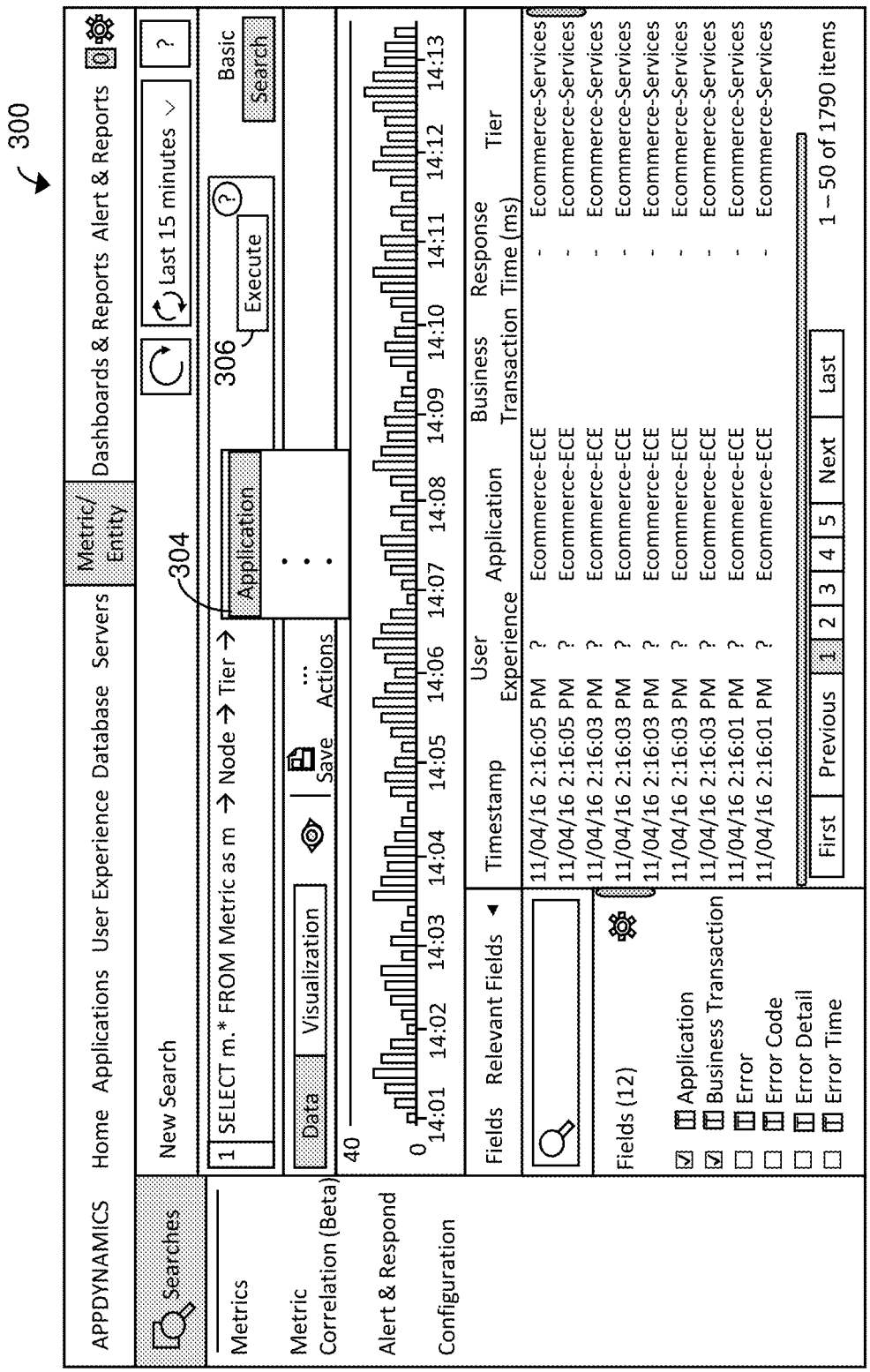
Figure 3H:
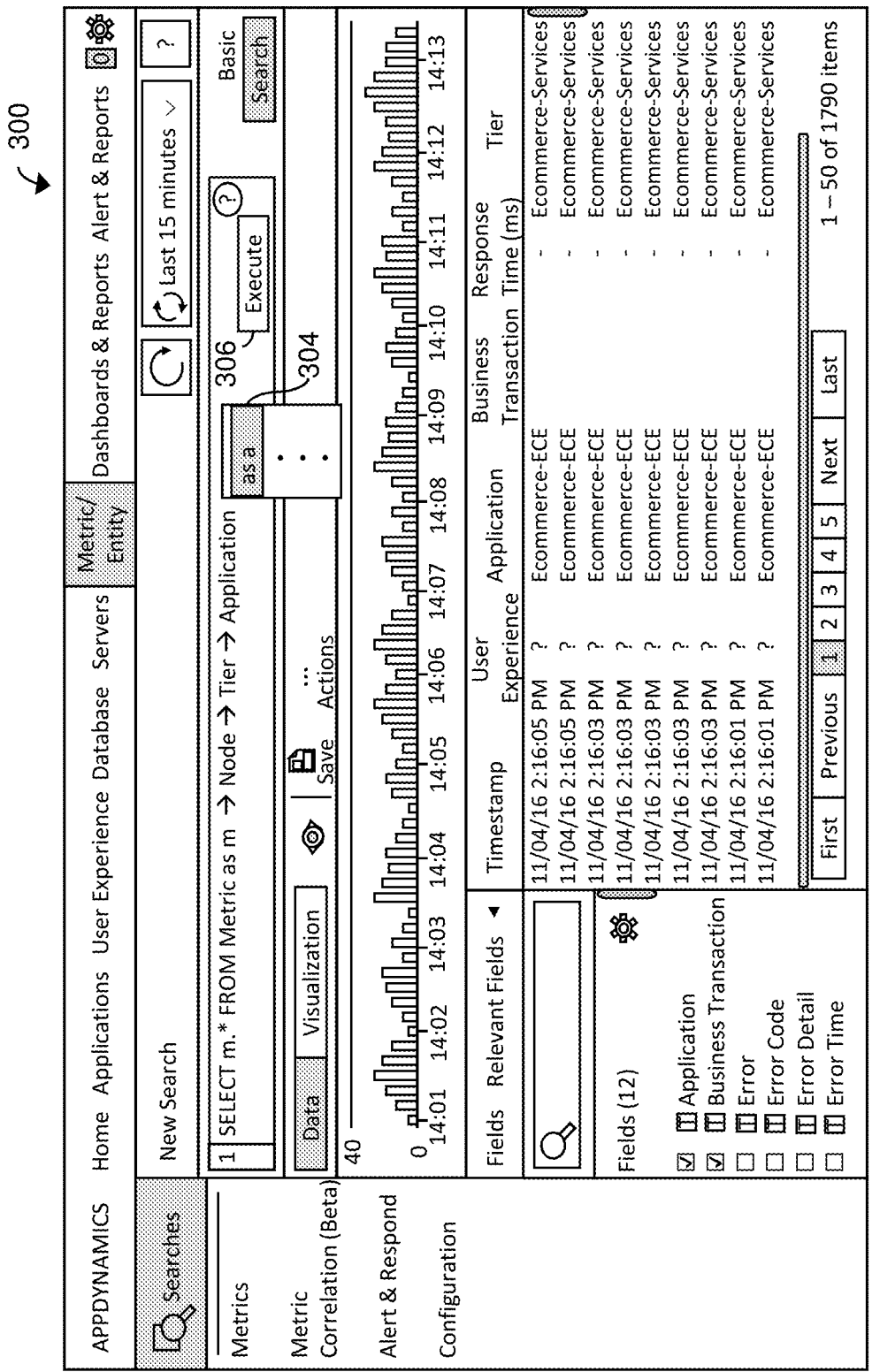
Figure 31:
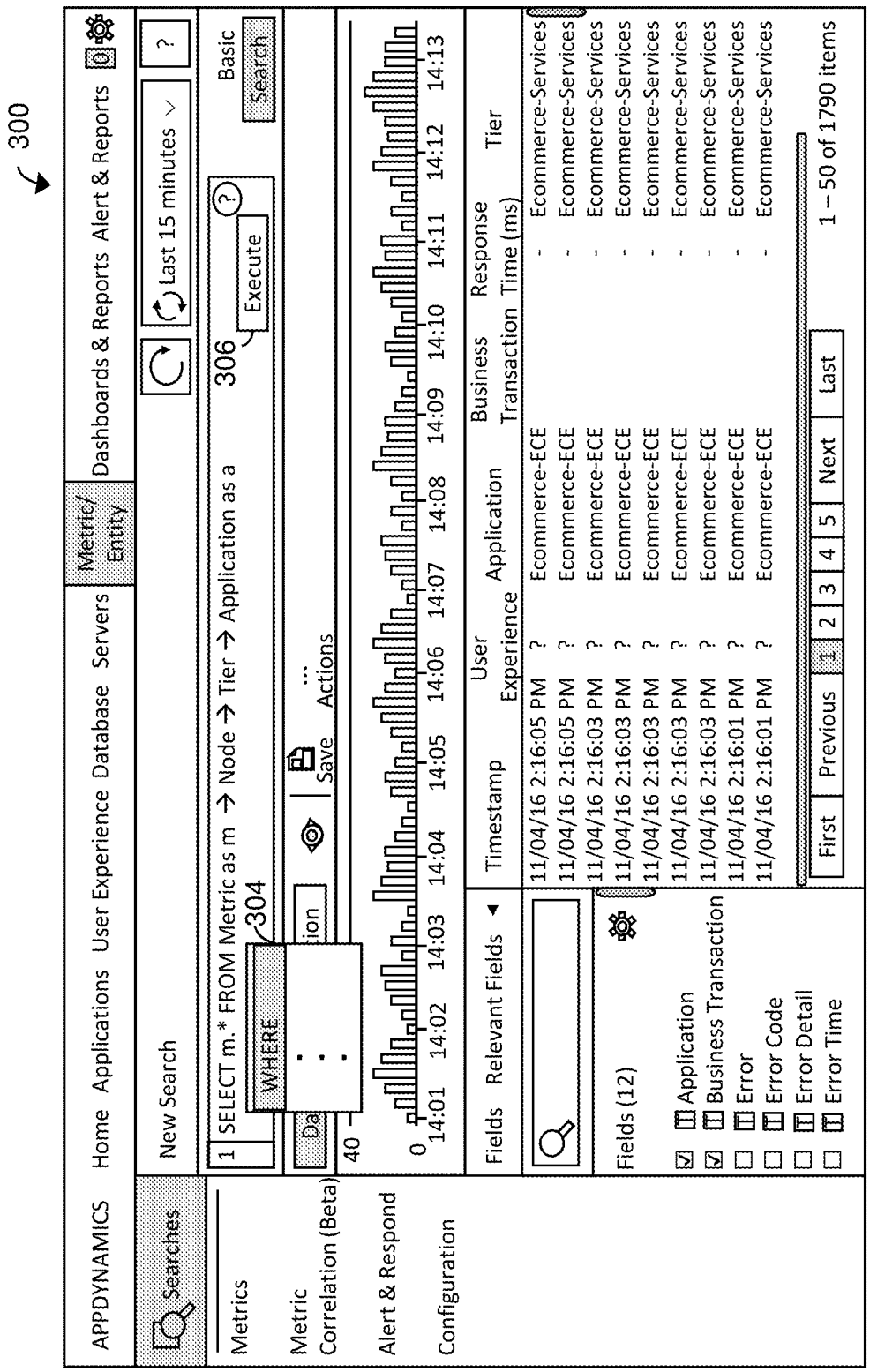
Figure 3J:
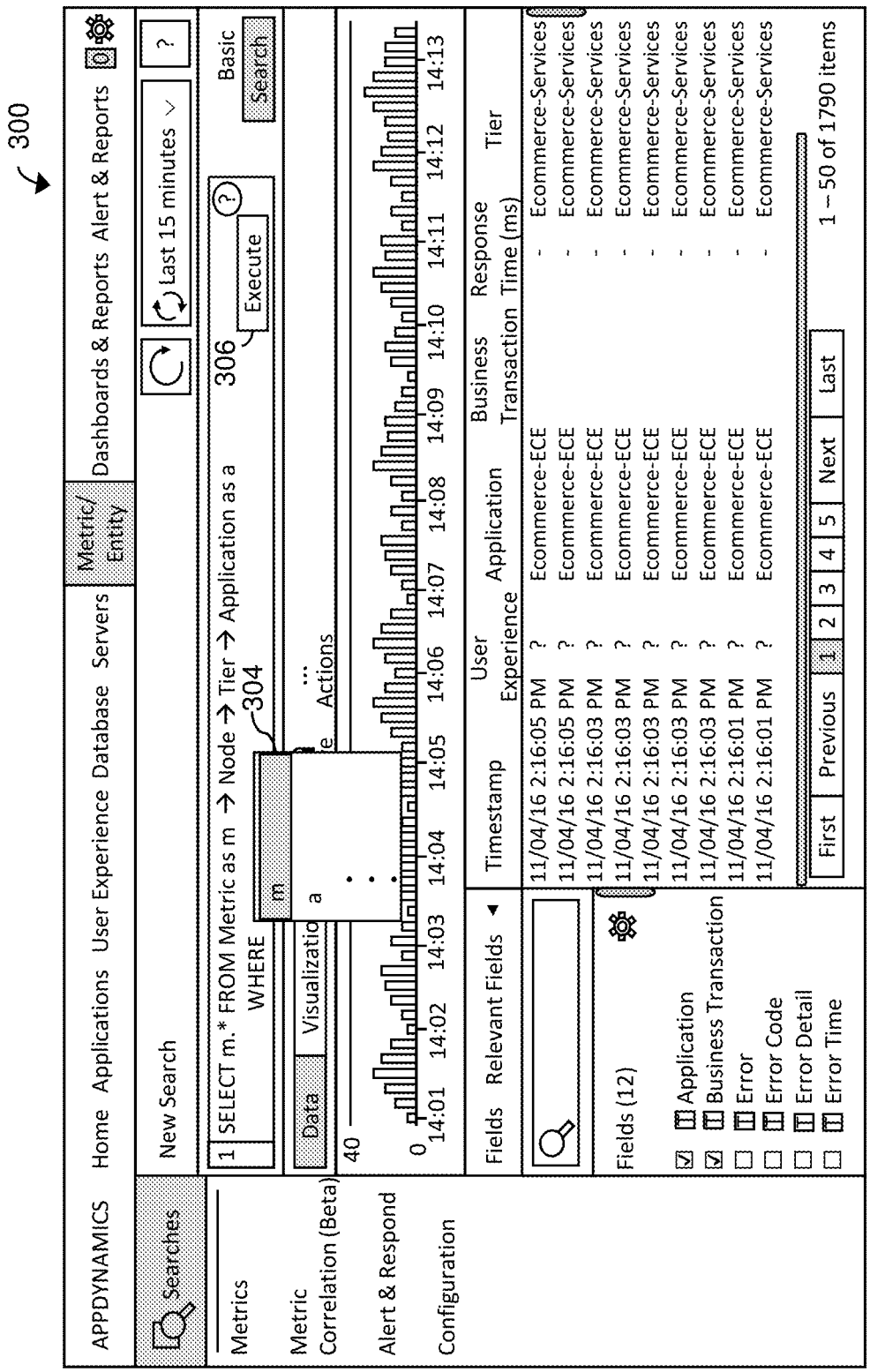
Figure 3K:
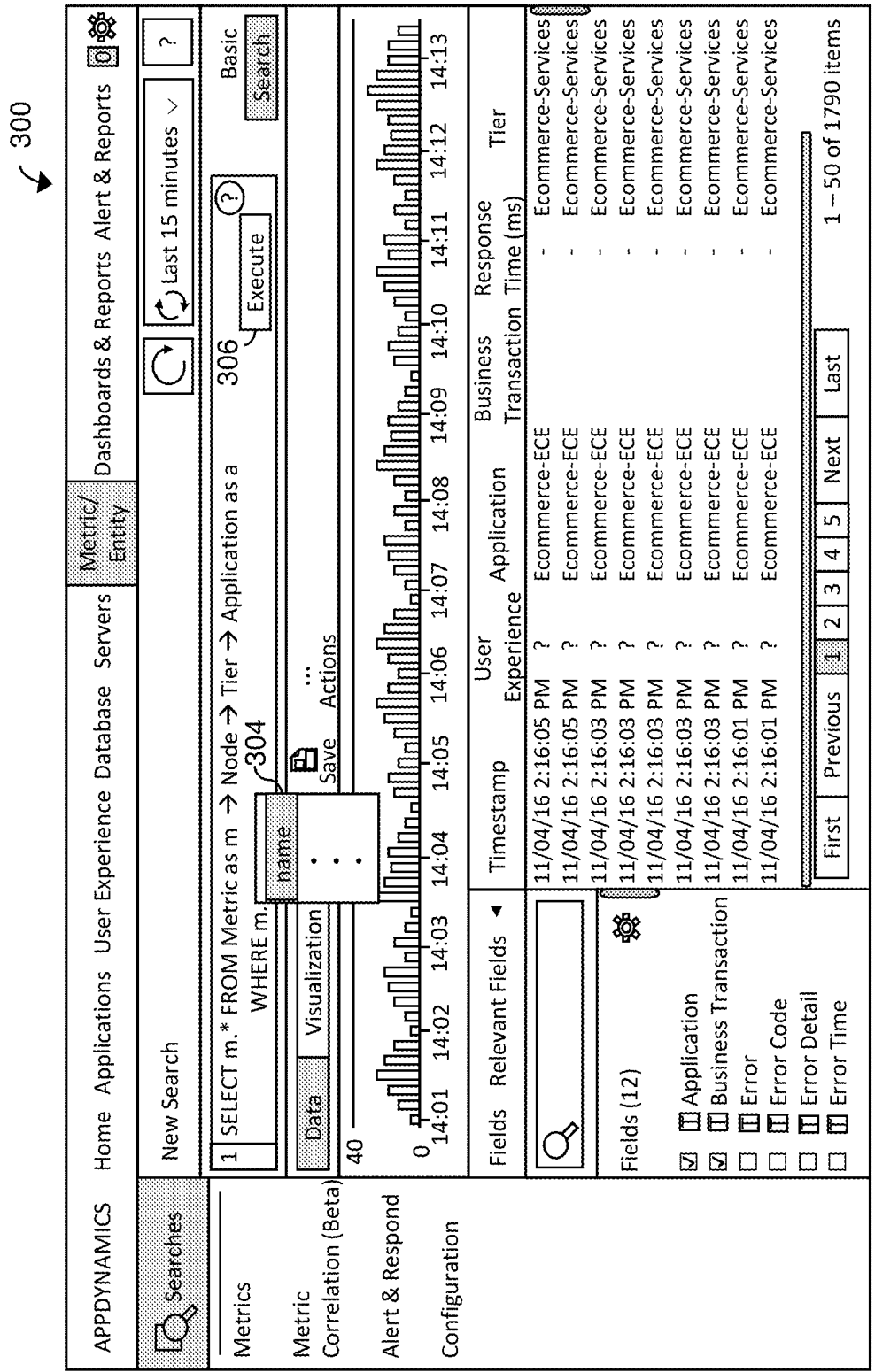
Figure 3L:
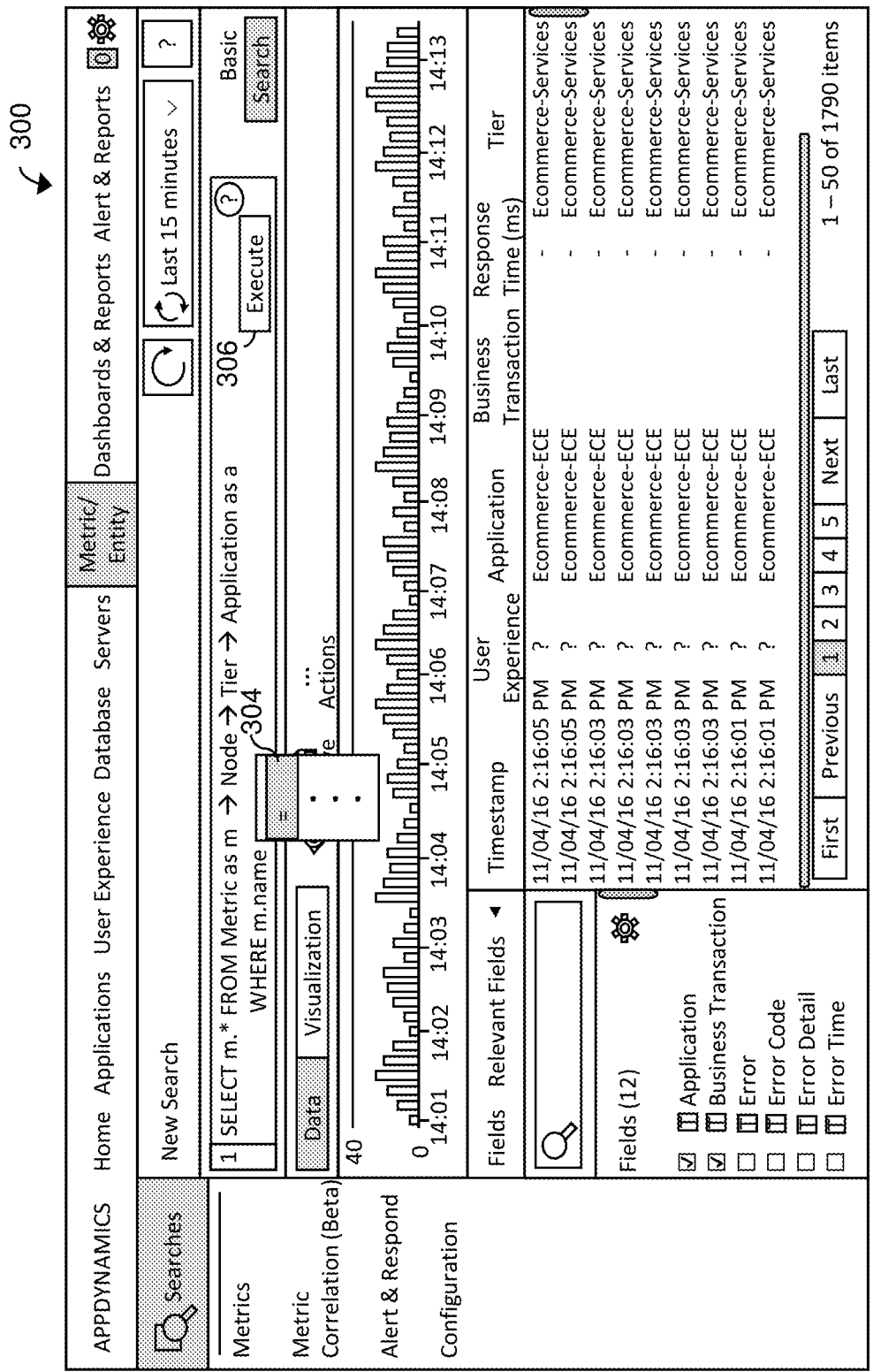
Figure 3M:
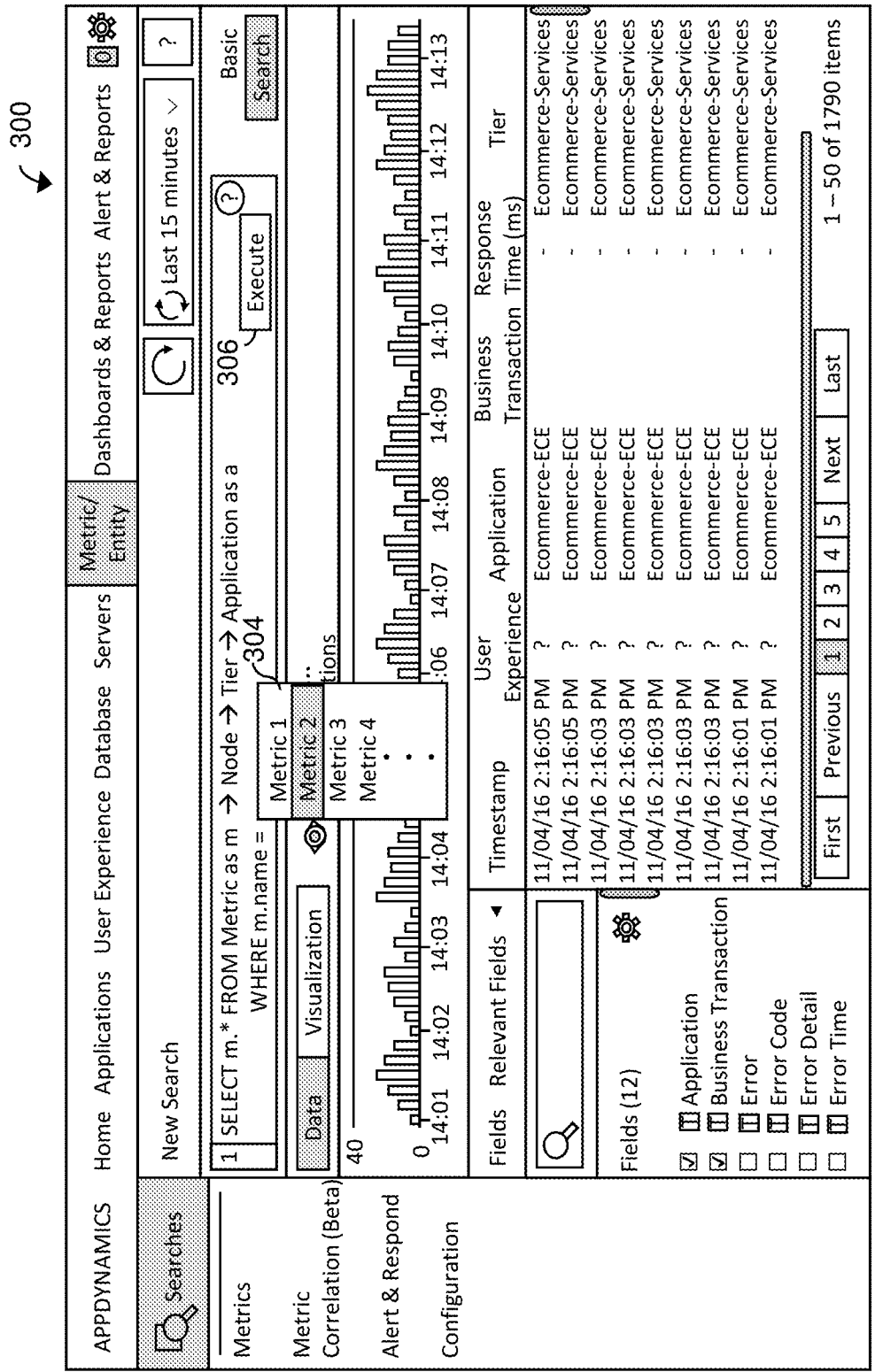
Figure 3N:
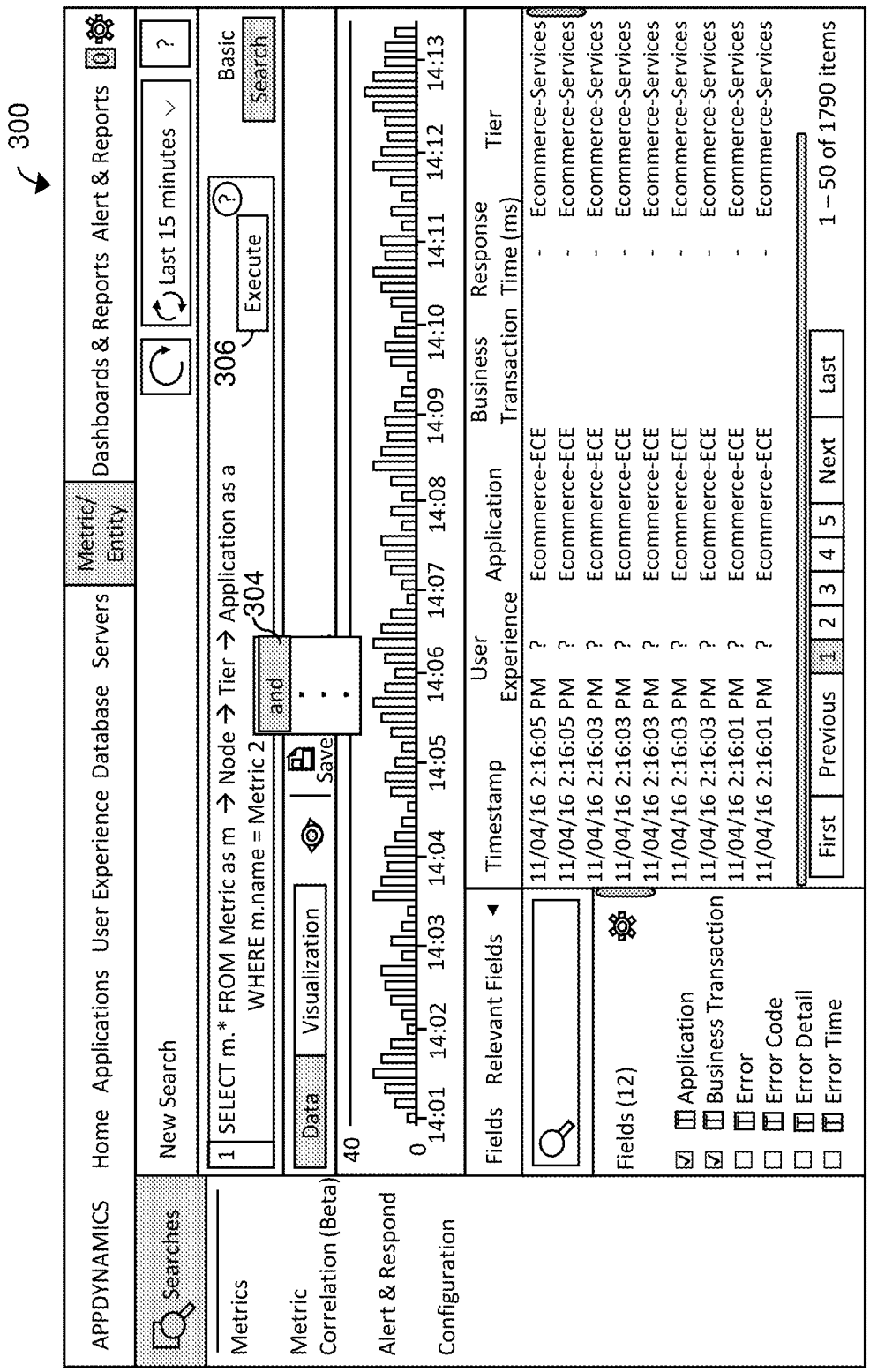
Figure 30:
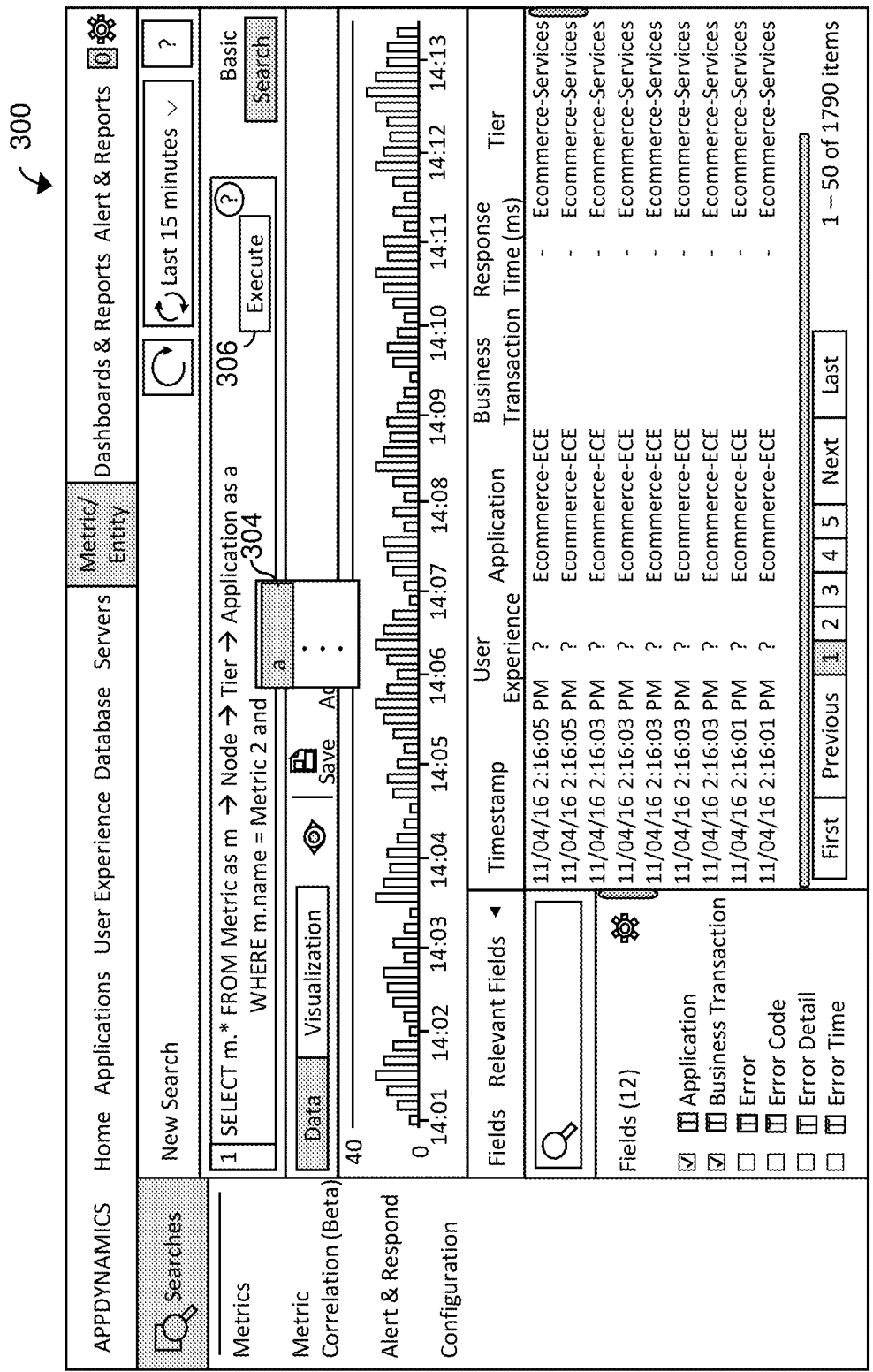
Figure 3P:
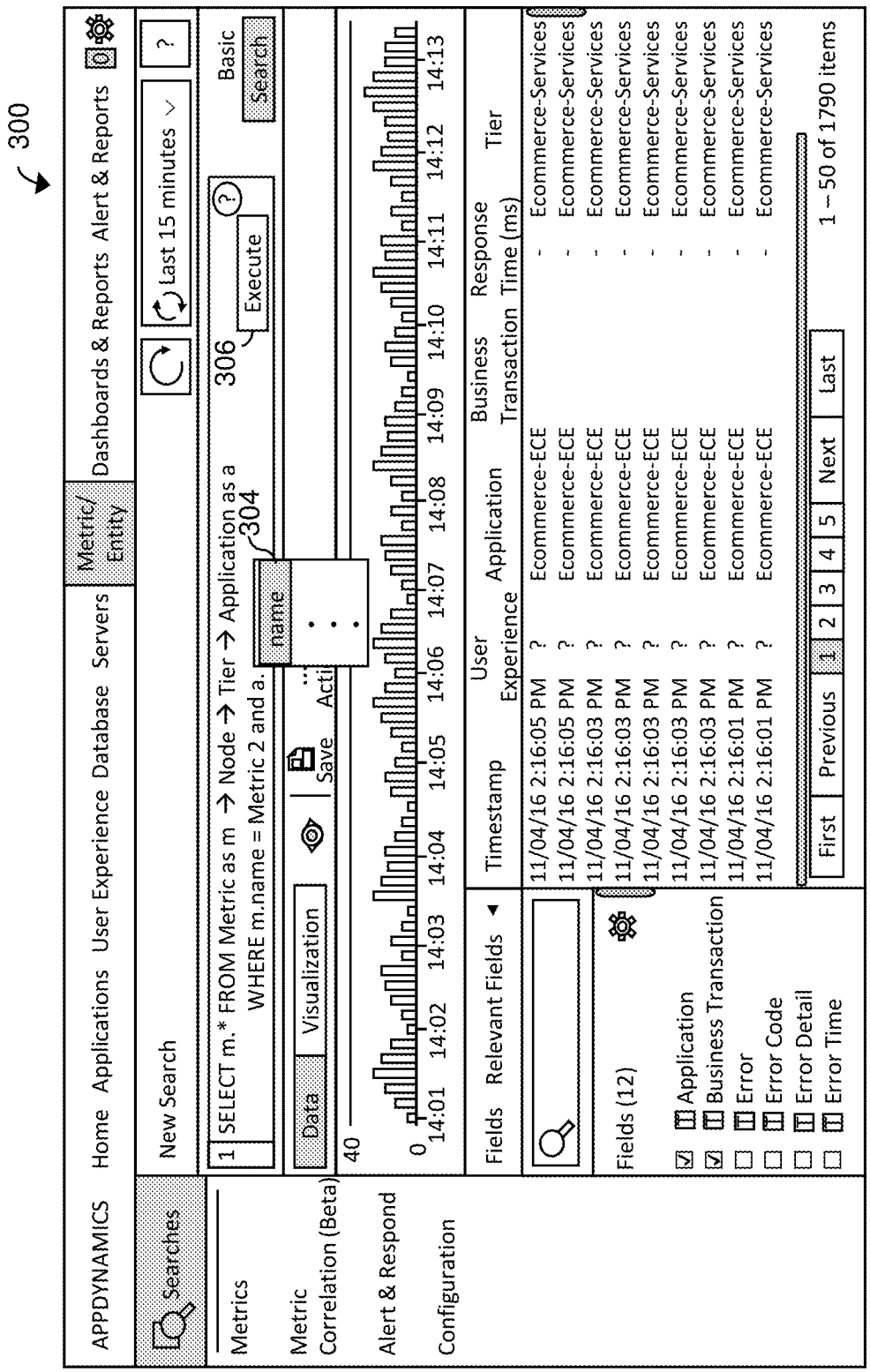
Figure 3Q:
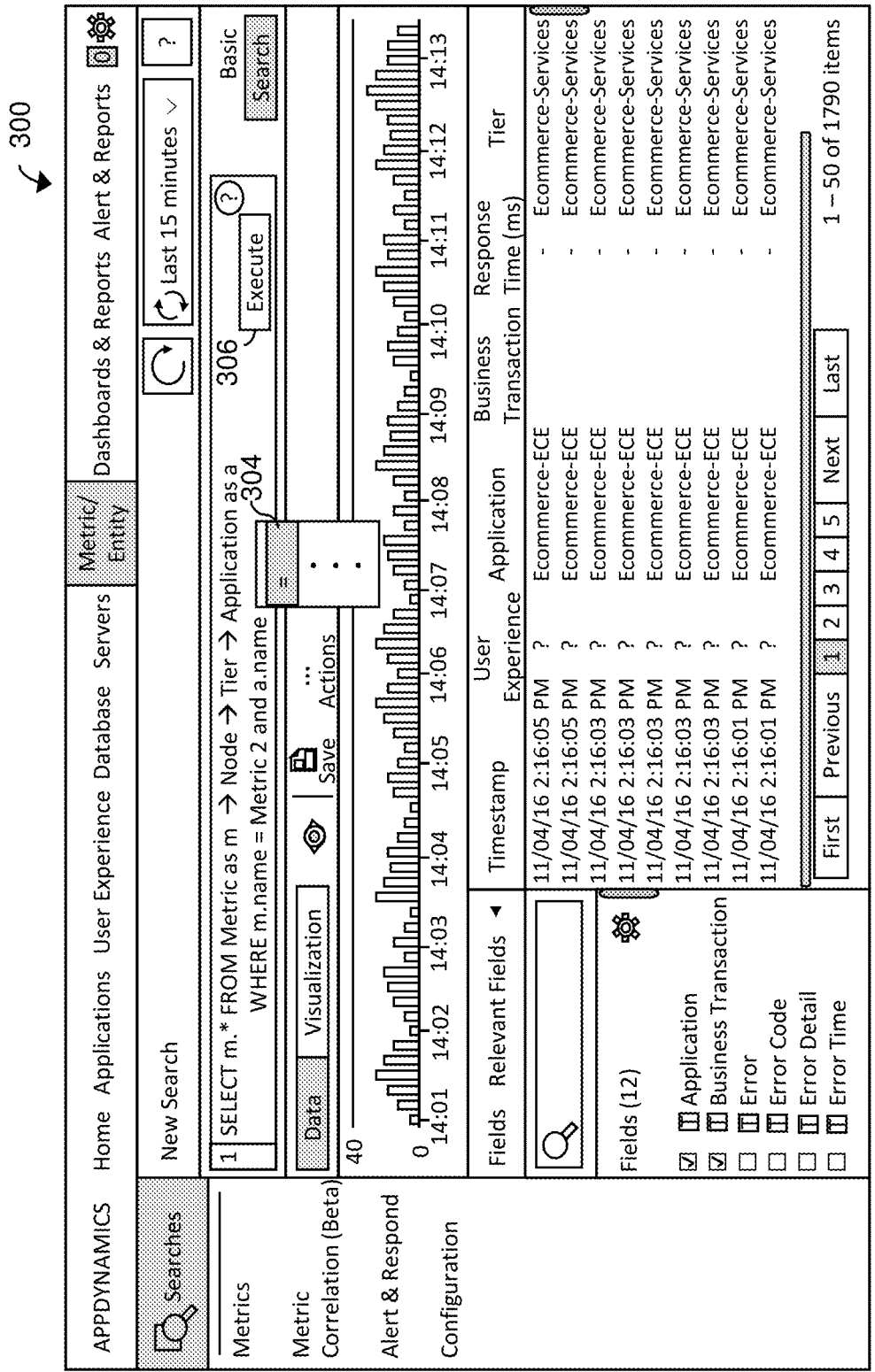
Figure 3R:
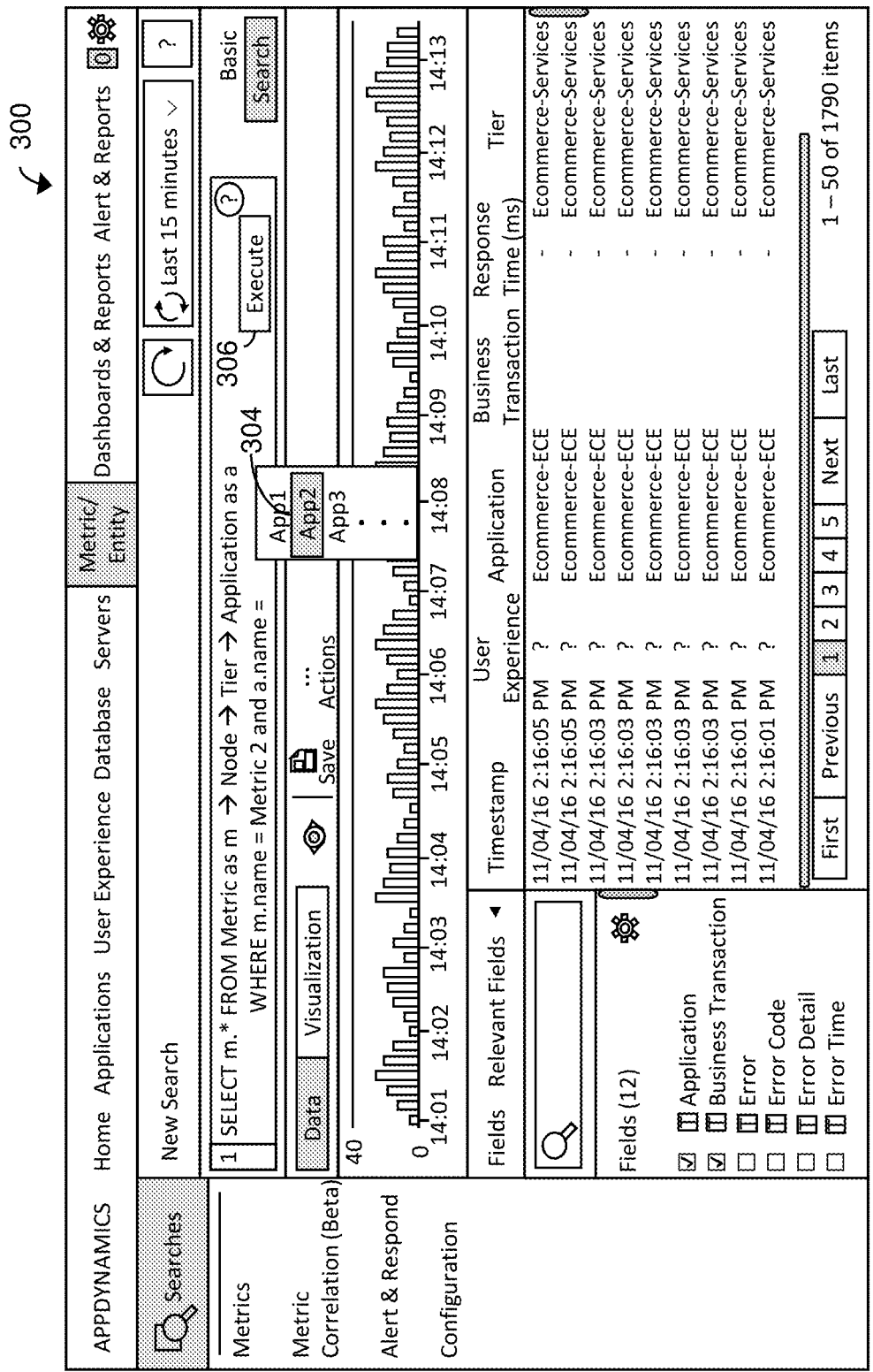
Figure 3S:
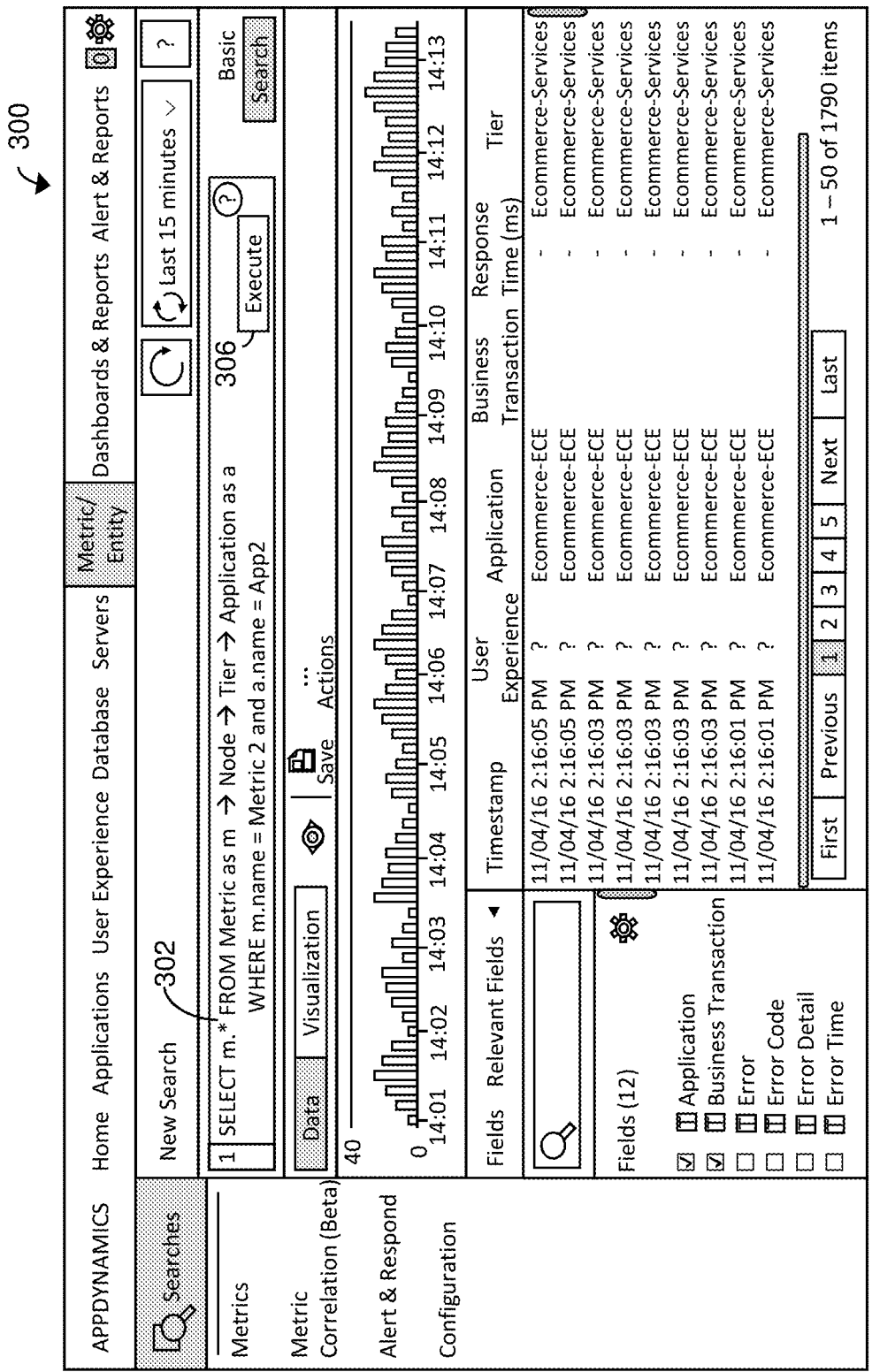

FIGS. 3A through 3S are block diagrams of an exemplary interactive user interface 300 illustrating a process for enabling a user to create an advanced query that includes graph searches in an SQL style query. An input is received indicating that a New Search 301 is initiated. Indication of initiating a new search can include detecting user interaction with the search interface element 302. In the example shown in FIGS. 3A through 3S, the search interface element 302 is illustrated as an input box where a user can both type texts and select from suggested lists. In addition to the input window, the search interface can include drop down menus, buttons, or any other compatible user interface elements for providing a user selection or input.

The search interface element 302 is an interactive element that can be used to dynamically provide suggestions to the user on the fly while the user is providing an input. In the example shown in FIG. 3A, the use has already entered 'SELECT m.* FROM Metric' in the search interface element 302 to start the query creation process. Detecting the user input in the search interface element 302 indicates that an advanced search for Metric data source has been initiated. Responsive to detecting the user input in the search interface element 302, suggestions are provided to the user based on the context or recognized pattern of the existing preceding input (e.g., 'SELECT m.* FROM Metric'). The suggestion element 304 shows 'as m', '→', and 'WHERE' to indicate the suggested inputs to follow the existing 'SELECT m.* FROM Metric' input in the search interface element 302. These suggestions can be based on the context or recognized pattern of the FROM clause. The user selection of 'as m', '→', and 'WHERE', can be detected to represent the decision to use an alias, continue the chain in the query, or end the chain in the query respectively. If the chain is ended, the user can execute the completed query by interacting with an input element, such as an 'Execute' button 306.

FIG. 3B shows the result of receiving the user selection of 'as m.' After receiving the user selection of the suggested 'as m' input, the suggestion element 304 provides the next appropriate suggestions, such as '→' or "WHERE" based on the context or pattern recognition of the FROM clause that indicate 'FROM Metric as m'. Because the FROM clause contains the graph traversal paths, the '→' is suggested to indicate adding the next link in the chain of the graph traversal path. Also, the 'WHERE' input suggested indicate the ability to end the chain. If the chain is ended, the user can execute the completed query by interacting with an input element, such as an 'Execute' button 306.

The suggestion element 304 next provides suggestions that are related to the existing 'FROM Metric as m →' clause based on the context or recognized pattern. In the example shown in FIG. 3C, 'Node, Tier, and Application . . . ' are suggested to the user as the related entities.

Responsive to detecting user selection of 'Node', FIG. 3D shows the next step in the suggestion process. Based on the context or recognized pattern of the 'FROM Metric as m→Node' clause, the suggestion element 304 provides 'as m', '→', and 'WHERE' as the appropriate suggestions. This is in recognition of the FROM clause that contains the graph traversal path, and thus the suggestion of the '→' input represents the ability to add another link in the chain of the graph traversal path. The 'as m' suggestion provides the ability to use an alias. The 'WHERE' suggestion provides the ability to end the chain. If the chain is ended, the user can execute the completed query by interacting with an input element, such as an 'Execute' button 306.

Responsive to detecting user selection of '→', FIG. 3E shows the next step in the suggestion process. Based on the context or recognized pattern of the 'FROM Metric as m→Node →' clause, the suggestion element 304 provides 'Tier' and 'Application . . . ' as the appropriate suggestions. This is in recognition of the FROM clause that contains the graph traversal path, and thus the suggestion of the 'Tier' and 'Application . . . ' input represents the entities related to the Node.

Responsive to detecting user selection of one of the entities, such as 'Tier', FIG. 3F shows the next step in the suggestion process. Based on the context or recognized pattern of the 'FROM Metric as m→Node→Tier' clause, the suggestion element 304 provides '→' and 'WHERE' as the appropriate suggestions. This is in recognition of the FROM clause that contains the graph traversal path, and thus the suggestion of the '→' input represents the ability to add another link in the chain of the graph traversal path. The suggestion of 'WHERE' provides the ability to end the chain. If the chain is ended, the user can execute the completed query by interacting with an input element, such as an 'Execute' button 306.

Responsive to detecting user selection of '→', FIG. 3G shows the next step in the suggestion process. Based on the context or recognized pattern of the 'FROM Metric as m→Node→Tier→' clause, the suggestion element 304 provides 'Application . . . ' as the appropriate suggestion. This is in recognition of the FROM clause that contains the graph traversal path, and thus the suggestion of the 'Application . . . ' input represents the entities related to the Tier.

Because the previous selection was a Tier, the most likely entity is 'Application.' Responsive to detecting user selection of 'Application', FIG. 3H shows the next step in the suggestion process. Based on the context or recognized pattern of the 'FROM Metric as m→Node→Tier→Application' clause, the suggestion element 304 provides 'as a . . . ' as the appropriate suggestion. This is in recognition of the FROM clause that contains the graph traversal path and thus the suggestion of the 'as a' input represents the identification of the Application entity.

In the example shown in FIGS. 3A-3S, the selection of 'as a' ends the FROM clause in the query. As shown in FIG. 3I, the WHERE clause is created next. The user can directly enter the 'WHERE' input or the clause can be suggested to the user based on the context or recognition of the pattern. Responsive to the detected input of the WHERE clause, the suggestion element 304 provides 'm' or 'a . . . ' as the suggestion to start the WHERE clause as shown in FIG. 3J. Based on the context or recognition of the pattern of the query created to this point, the WHERE clause is most likely to be used to identify each of the variables, 'm' and 'a'.

In the example shown in FIG. 3K, user selection of 'm' is detected. Responsive to the detection of the user selection of 'm', the suggestion element 304 provides 'name . . . ' as the suggestion to indicate the name of 'm' Metric. This is based on the context or recognition of the pattern of the query created to this point.

As shown in FIG. 3L, responsive to detecting user selection of 'name', the suggestion element 304 provides '= . . . ' as the suggestion. This is based on the context or recognized pattern of the existing WHERE clause 'WHERE m.name' to indicate setting a value for 'm.name'. This is based on the context or recognition of the pattern of the query created to this point.

As shown in FIG. 3M and responsive to detecting the user selection of the '=' input, the suggestion element 304 provides a list of the available Metric names, such as 'Metric 1, Metric 2, Metric 3, Metric 4 . . . ' This is based on the context or recognition of the pattern of the query created to this point.

As shown in FIG. 3N, responsive to detecting the user selection of one of the Metric names input, such as 'Metric 2', the suggestion element 304 provides and . . . ' as the suggestion. This is based on the context or recognition of the pattern of the query created to this point. Because the variable 'a' is available to be identified with a name, the suggestion of 'and' is predicted and suggested.

Responsive to detecting user selection of 'and', the suggestion element 304 is use to suggest a list of available selections, such as 'a, m, Node, Metric . . . ' as shown in FIG. 3O. This is based on the context or recognition of the pattern of the query created to this point. Because the variable 'a' has not be set, 'a' is the predicted to be the desired selection.

As shown in FIG. 3P and responsive to detecting user selection of 'a', the suggestion element 304 provides the available selections, such as 'name, =, Node, Tier . . . ' based on the context or recognized pattern of the query created to this point. Because the variable 'a' representing the Application was last selected, the 'name' input is the most appropriate selection.

As shown in FIG. 3Q, responsive to detecting user selection of 'name', the suggestion element 304 provides '= . . . ' as the suggestion. This is based on the context or recognized pattern of the existing WHERE clause 'WHERE m.name=Metric 2 and a.name=' to indicate setting a value for 'a.name'. This is based on the context or recognition of the pattern of the query created to this point.

As shown in FIG. 3R and responsive to detecting the user selection of the '=' input, the suggestion element 304 provides a list of the available Application names, such as 'App 1, App 2, App 3 . . . ' This is based on the context or recognition of the pattern of the query created to this point.

As shown in FIG. 3S and responsive to detecting the user selection of the 'App 2' input the query creation ends. The search interface element 302 now shows the completed SQL style query with graph searches contained in the WHERE clause. The resultant query is as follows:

SELECT m.*
FROM Metric as m→Node→Tier→Application as a
WHERE m.name=Metric 2 and a.name=App2

Application Intelligence Platform Architecture

Figure 4:
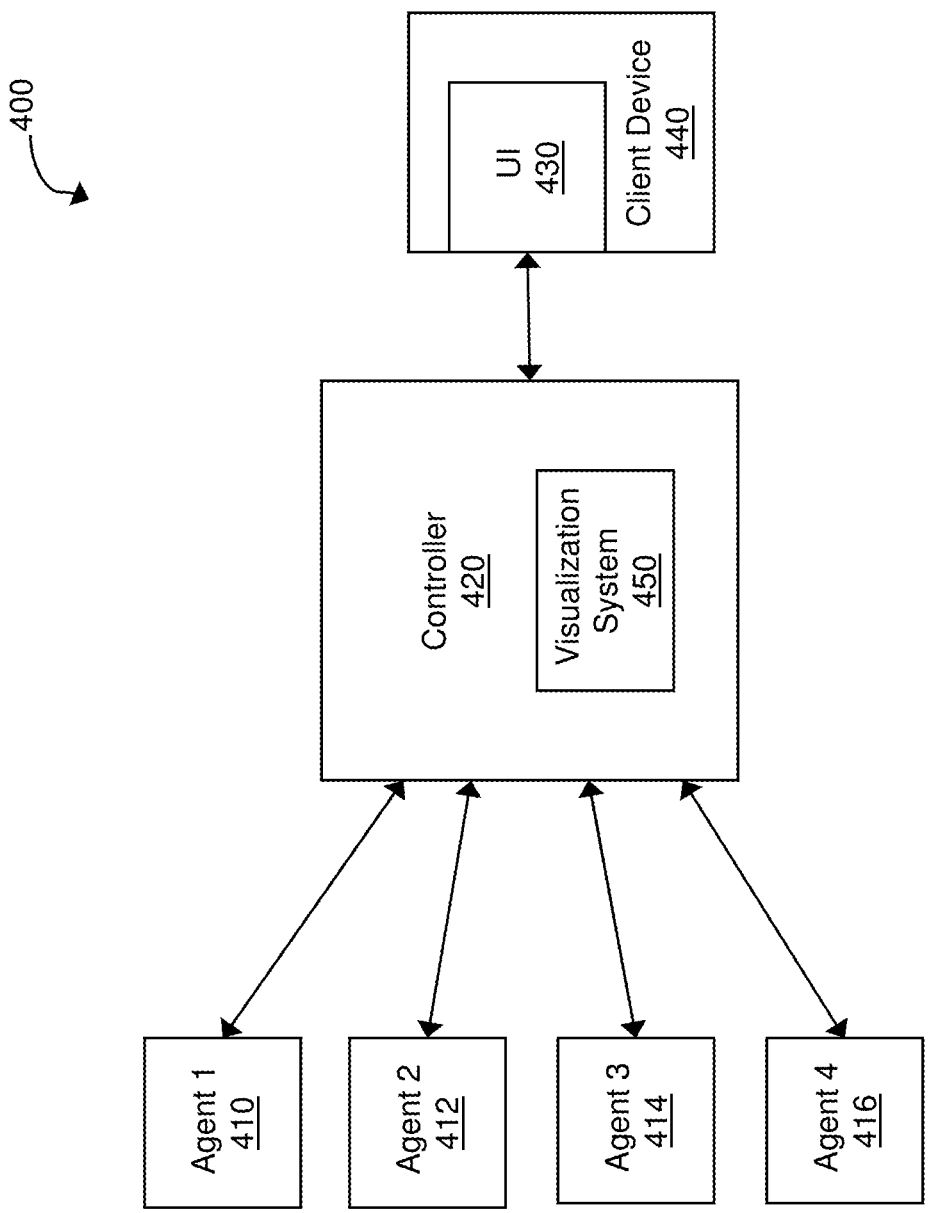
FIG. 4 is a block diagram of an exemplary application intelligence platform that can implement the graph searches in SQL style queries as disclosed in this patent document, including the processes disclosed with respect to FIGS. 1A-1D, 2A-2C, and 3A-3S.

FIG. 4 is a block diagram of an exemplary application intelligence platform 400 that can implement the graph searches in SQL style queries as disclosed in this patent document. The application intelligence platform is a system that monitors and collect metrics of performance data for an application environment being monitored. At the simplest structure, the application intelligence platform includes one or more agents 410, 412, 414, 416 and one or more controllers 420. While FIG. 4 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 420 is the central processing and administration server for the application intelligence platform. The controller 320 serves a browser-based user interface (UI) 430 that is the primary interface for monitoring, analyzing, and troubleshooting the monitored environment. The controller 420 can control and manage monitoring of business transactions distributed over application servers. Specifically, the controller 420 can receive runtime data from agents 410, 412, 414, 416 and coordinators, associate portions of business transaction data, communicate with agents to configure collection of runtime data, and provide performance data and reporting through the interface 430. The interface 430 may be viewed as a web-based interface viewable by a client device 440. In some implementations, a client device 440 can directly communicate with controller 420 to view an interface for monitoring data.

In the Software as a Service (SaaS) implementation, a controller instance 420 is hosted remotely by a provider of the application intelligence platform 400. In the on-premise (On-Prem) implementation, a controller instance 420 is installed locally and self-administered.

The controllers 420 receive data from different agents 410, 412, 414, 416 deployed to monitor applications, databases and database servers, servers, and end user clients for the monitored environment. Any of the agents 410, 412, 414, 416 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 410, 412, 414, 416) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 420 can include a visualization system 450 for displaying the reports generated by the Reporters at the browser agents as disclosed in this patent document. In some implementations, the visualization system 450 can be implemented in a separate machine (e.g., a server) different from the one hosting the controller 420.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 5:
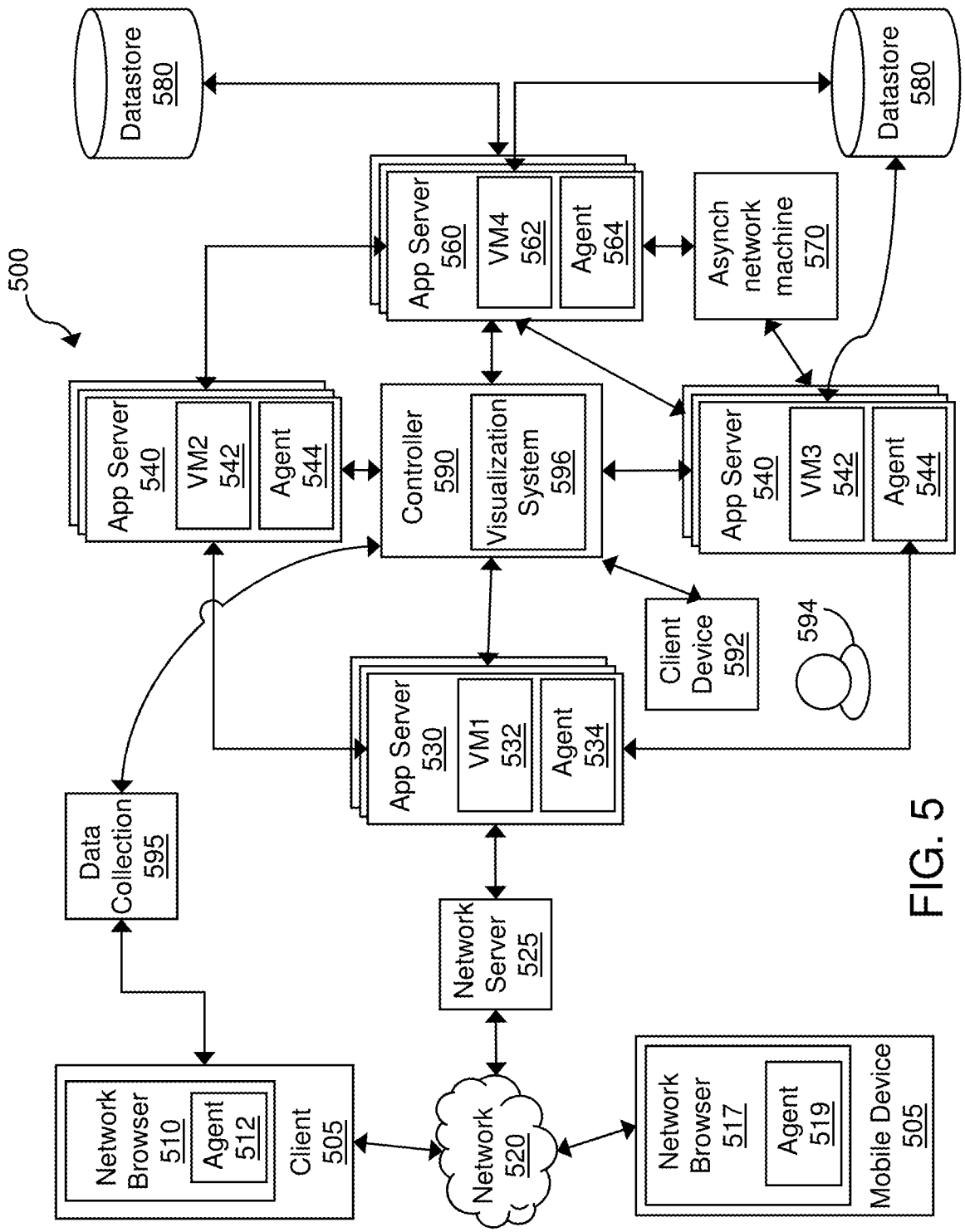
FIG. 5 is a block diagram of an exemplary system for performing graph searches in SQL style queries as disclosed in this patent document, including the processes disclosed with respect to FIGS. 1A-1D, 2A-2C, and 3A-3S.

FIG. 5 is a block diagram of an exemplary system 400 for performing graph searches in SQL style queries as disclosed in this patent document, including the processes disclosed with respect to FIGS. 1A-D, 2A-2C, and 3A-3R. The system 500 in FIG. 5 includes client device 505 and 592, mobile device 515, network 520, network server 525, application servers 530, 540, 550 and 560, asynchronous network machine 570, data stores 580 and 585, controller 590, and data collection server 595. The controller 590 can include visualization system 596 for providing displaying of the report generated by the Reporters at the browser agents as disclosed in this patent document. In some implementations, the visualization system 596 can be implemented in a separate machine (e.g., a server) different from the one hosting the controller 590.

Client device 505 may include network browser 510 and be implemented as a computing device, such as for example a laptop, desktop, workstation, or some other computing device. Network browser 510 may be a client application for viewing content provided by an application server, such as application server 530 via network server 525 over network 520.

Network browser 510 may include agent 512. Agent 512 may be installed on network browser 510 and/or client 505 as a network browser add-on, downloading the application to the server, or in some other manner. Agent 512 may be executed to monitor network browser 510, the operating system of client 505, and any other application, API, or another component of client 505. Agent 512 may determine network browser navigation timing metrics, access browser cookies, monitor code, and transmit data to data collection 560, controller 590, or another device. Agent 512 may perform other operations related to monitoring a request or a network at client 505 as discussed herein including report generating.

Mobile device 515 is connected to network 520 and may be implemented as a portable device suitable for sending and receiving content over a network, such as for example a mobile phone, smart phone, tablet computer, or other portable device. Both client device 505 and mobile device 515 may include hardware and/or software configured to access a web service provided by network server 525.

Mobile device 515 may include network browser 517 and an agent 519. Mobile device may also include client applications and other code that may be monitored by agent 519. Agent 519 may reside in and/or communicate with network browser 517, as well as communicate with other applications, an operating system, APIs and other hardware and software on mobile device 515. Agent 519 may have similar functionality as that described herein for agent 512 on client 505, and may report data to data collection server 560 and/or controller 590.

Network 520 may facilitate communication of data among different servers, devices and machines of system 500 (some connections shown with lines to network 520, some not shown). The network may be implemented as a private network, public network, intranet, the Internet, a cellular network, Wi-Fi network, VoIP network, or a combination of one or more of these networks. The network 520 may include one or more machines such as load balance machines and other machines.

Network server 525 is connected to network 520 and may receive and process requests received over network 520. Network server 525 may be implemented as one or more servers implementing a network service, and may be implemented on the same machine as application server 530 or one or more separate machines. When network 520 is the Internet, network server 525 may be implemented as a web server.

Application server 530 communicates with network server 525, application servers 540 and 550, and controller 590. Application server 550 may also communicate with other machines and devices (not illustrated in FIG. 5). Application server 530 may host an application or portions of a distributed application. The host application 532 may be in one of many platforms, such as including a Java, PHP, .Net, and Node.JS, be implemented as a Java virtual machine, or include some other host type. Application server 530 may also include one or more agents 534 (i.e. "modules"), including a language agent, machine agent, and network agent, and other software modules. Application server 530 may be implemented as one server or multiple servers as illustrated in FIG. 5.

Application 532 and other software on application server 530 may be instrumented using byte code insertion, or byte code instrumentation (BCI), to modify the object code of the application or other software. The instrumented object code may include code used to detect calls received by application 532, calls sent by application 532, and communicate with agent 534 during execution of the application. BCI may also be used to monitor one or more sockets of the application and/or application server in order to monitor the socket and capture packets coming over the socket.

In some embodiments, server 530 may include applications and/or code other than a virtual machine. For example, servers 530, 540, 550, and 560 may each include Java code, .Net code, PHP code, Ruby code, C code, C++ or other binary code to implement applications and process requests received from a remote source. References to a virtual machine with respect to an application server are intended to be for exemplary purposes only.

Agents 534 on application server 530 may be installed, downloaded, embedded, or otherwise provided on application server 530. For example, agents 534 may be provided in server 530 by instrumentation of object code, downloading the agents to the server, or in some other manner. Agent 534 may be executed to monitor application server 530, monitor code running in a virtual machine 532 (or other program language, such as a PHP, .Net, or C program), machine resources, network layer data, and communicate with byte instrumented code on application server 530 and one or more applications on application server 530.

Each of agents 534, 544, 554 and 564 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 534 may detect operations such as receiving calls and sending requests by application server 530, resource usage, and incoming packets. Agent 534 may receive data, process the data, for example by aggregating data into metrics, and transmit the data and/or metrics to controller 590. Agent 534 may perform other operations related to monitoring applications and application server 530 as discussed herein. For example, agent 534 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 590 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 534 may create a request identifier for a request received by server 530 (for example, a request received by a client 505 or 515 associated with a user or another source). The request identifier may be sent to client 505 or mobile device 515, whichever device sent the request. In embodiments, the request identifier may be created when a data is collected and analyzed for a particular business transaction.

Each of application servers 540, 550 and 560 may include an application and agents. Each application may run on the corresponding application server. Each of applications 542, 552 and 562 on application servers 540-560 may operate similarly to application 532 and perform at least a portion of a distributed business transaction. Agents 544, 554 and 564 may monitor applications 542-562, collect and process data at runtime, and communicate with controller 590. The applications 532, 542, 552 and 562 may communicate with each other as part of performing a distributed transaction. In particular, each application may call any application or method of another virtual machine.

Asynchronous network machine 570 may engage in asynchronous communications with one or more application servers, such as application server 550 and 560. For example, application server 550 may transmit several calls or messages to an asynchronous network machine. Rather than communicate back to application server 550, the asynchronous network machine may process the messages and eventually provide a response, such as a processed message, to application server 560. Because there is no return message from the asynchronous network machine to application server 550, the communications among them are asynchronous.

Data stores 580 and 585 may each be accessed by application servers such as application server 550. Data store 585 may also be accessed by application server 550. Each of data stores 580 and 585 may store data, process data, and return queries received from an application server. Each of data stores 580 and 585 may or may not include an agent.

Controller 590 may control and manage monitoring of business transactions distributed over application servers 530-560. In some embodiments, controller 590 may receive application data, including data associated with monitoring client requests at client 505 and mobile device 515, from data collection server 560. In some embodiments, controller 590 may receive application monitoring data and network data from each of agents 512, 519, 534, 544 and 554. Controller 590 may associate portions of business transaction data, communicate with agents to configure collection of data, and provide performance data and reporting through an interface. The interface may be viewed as a web-based interface viewable by client device 592, which may be a mobile device, client device, or any other platform for viewing an interface provided by controller 590. In some embodiments, a client device 592 may directly communicate with controller 590 to view an interface for monitoring data.

Client device 592 may include any computing device, including a mobile device or a client computer such as a desktop, work station or other computing device. Client computer 592 may communicate with controller 590 to create and view a custom interface. In some embodiments, controller 590 provides an interface for creating and viewing the custom interface as a content page, e.g., a web page, which may be provided to and rendered through a network browser application on client device 592.

Applications 532, 542, 552 and 562 may be any of several types of applications. Examples of applications that may implement applications 532-562 include a Java, PHP, .Net, Node.JS, and other applications.

FIG. 6 is a block diagram of a computer system 600 for implementing the present technology. System 600 of FIG. 6 may be implemented in the contexts of the likes of clients 605, 692, network server 625, servers 630, 640, 650, 660, a synchronous network machine 670 and controller 690.

The computing system 600 of FIG. 6 includes one or more processors 610 and memory 620. Main memory 620 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable or remote storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a compact disk, digital video disk, magnetic disk, flash storage, etc. to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for performing graph searches in a structured query language (SQL) for monitored data, comprising:
   receiving, by a controller in communication with agents installed at machines connected over a network, monitored data regarding business applications running over the machines;
   identifying, by the controller, performance issues from the received monitored data;
   providing, by the controller, an interactive user interface to enable creation of a query for the monitored data and the identified performance issues;
   receiving, through the provided interactive user interface, input associated with a new query including a SELECT clause, a FROM clause, and a WHEREIN clause;
   creating the new query based on the received input;
   converting at least a portion of the new query to contain a graph traversal path entirely within the FROM clause, wherein the graph traversal path represents a set of nodes the query must traverse, wherein the set of nodes are particular machines of the machines connected over that network that perform at least part of a business application of the business application, wherein the business application is indicated by the received input;
   executing the new query; and
   returning a result of the executed new query.

2. The method as in claim 1, further comprising:
   receiving an indication of initiating a basic or advanced query.

3. The method as in claim 1, further comprising:
   providing, by the controller, a suggestion for at least a portion of the new query based on the received input.

4. The method as in claim 3, further comprising:
   analyzing a context of at least a portion of the received input to provide the suggestion.

5. The method as in claim 3, further comprising:
   recognizing a pattern of at least a portion of the received input to provide the suggestion.

6. The method as in claim 3, wherein the provided suggestion includes a list of related entities.

7. The method as in claim 1, wherein the new query includes the SELECT clause and the WHEREIN clause in SQL style.

8. The method as in claim 1, wherein the graph traversal path is representative of a chain of relationship between different entities.

9. A non-transitory computer readable storage medium having embodied thereon a program, the program being executable by a processor to perform a method for performing graph searches in a structured query language (SQL) for monitored data, the method comprising:
   receiving, by a controller in communication with agents installed at machines connected over a network, monitored data regarding business applications running over the machines;
   identifying, by the controller, performance issues from the received monitored data;
   providing, by the controller, an interactive user interface to enable creation of a query for the monitored data and the identified performance issues;
   receiving, through the provided interactive user interface, input associated with a new query including a SELECT clause, a FROM clause, and a WHEREIN clause;
   creating the new query based on the received input;
   converting at least a portion of the new query to contain a graph traversal path entirely within the FROM clause, wherein the graph traversal path represents a set of nodes the query must traverse, wherein the set of nodes are particular machines of the machines connected over that network that perform at least part of a business application of the business application, wherein the business application is indicated by the received input;
   executing the new query; and
   returning a result of the executed new query.

10. The non-transitory computer readable storage medium of claim 9, further comprising:
    receiving an indication of initiating a basic or advanced query.

11. The non-transitory computer readable storage medium of claim 9, further comprising:
    providing, by the controller, a suggestion for at least a portion of the new query based on the received input.

12. The non-transitory computer readable storage medium of claim 11, further comprising:
    analyzing a context of at least a portion of the received input to provide the suggestion.

13. The non-transitory computer readable storage medium of claim 11, further comprising:
recognizing a pattern of at least a portion of the received input to provide the suggestion.

14. The non-transitory computer readable storage medium of claim 11, wherein the provided suggestion includes a list of related entities.

15. The non-transitory computer readable storage medium of claim 9, wherein the new query includes the SELECT clause and the WHEREIN clause in SQL style.

16. The computer-readable media as in claim 9, wherein the graph traversal path is representative of a chain of relationship between different entities.

17. A system for performing graph searches in a structured query language (SQL) for monitored data, the system comprising:
a server including a processor and memory,
one or more modules stored in them memory and executable by the processor to:
receive, by a controller in communication with agents installed at machines connected over a network, monitored data regarding business applications running over the machines;
identify, by the controller, performance issues from the received monitored data;
provide, by the controller, an interactive user interface to enable creation of a query for the monitored data and the identified performance issues;
receive, through the provided interactive user interface, input associated with a new query including a SELECT clause, a FROM clause, and a WHEREIN clause;
create the new query based on the received input;
convert at least a portion of the new query to contain a graph traversal path entirely within the FROM clause, wherein the graph traversal path represents a set of nodes the query must traverse, wherein the set of nodes are particular machines of the machines connected over that network that perform at least part of a business application of the business application, wherein the business application is indicated by the received input;
execute the new query; and
return a result of the executed new query.

18. The system of claim 17, the one or more modules further executable by the processor to:
receive an indication of initiating a basic or advanced query.

19. The system of claim 17, the one or more modules further executable by the processor to:
provide, by the controller, a suggestion for at least a portion of the new query based on the received input.

20. The system of claim 19, the one or more modules further executable by the processor to:
analyze a context of at least a portion of the received input to provide the suggestion.

21. The system of claim 19, the one or more modules further executable by the processor to:
recognize a pattern of at least a portion of the received input to provide the suggestion.

22. The system of claim 19, wherein the provided suggestion includes a list of related entities.

23. The system of claim 17, wherein the new query includes the SELECT clause and the WHEREIN clause in SQL style.

24. The system of claim 17, wherein the graph traversal path is representative of a chain of relationship between different entities.

* * * * *